(12) United States Patent
Toudou et al.

(10) Patent No.: US 7,748,898 B2
(45) Date of Patent: Jul. 6, 2010

(54) TEMPERATURE SENSOR AND METHOD OF PRODUCING THE TEMPERATURE SENSOR

(75) Inventors: Yuusuke Toudou, Kariya (JP); Kaoru Kuzuoka, Toyota (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/034,907

(22) Filed: Feb. 21, 2008

(65) Prior Publication Data

US 2008/0205484 A1 Aug. 28, 2008

(30) Foreign Application Priority Data

Feb. 27, 2007 (JP) ............................. 2007-046769
Mar. 1, 2007 (JP) ............................. 2007-051215

(51) Int. Cl.
*G01K 1/00* (2006.01)
*G01K 7/00* (2006.01)
*H01C 1/03* (2006.01)
*H01C 1/028* (2006.01)

(52) U.S. Cl. .................. 374/208; 374/183; 338/243; 338/238; 338/28

(58) Field of Classification Search .............. 374/208, 374/183, 185; 338/243, 238
See application file for complete search history.

(56) References Cited

U.S. PATENT DOCUMENTS

| | | | | |
|---|---|---|---|---|
| 4,435,693 | A * | 3/1984 | Johnson | 338/238 |
| 5,142,266 | A | 8/1992 | Friese et al. | |
| 6,297,723 | B1 * | 10/2001 | Shoji et al. | 338/28 |
| 6,639,505 | B2 * | 10/2003 | Murata et al. | 338/25 |
| 7,104,685 | B2 | 9/2006 | Hanzawa et al. | |
| 2005/0265426 | A1 | 12/2005 | Hanzawa et al. | |
| 2006/0013282 | A1 | 1/2006 | Hanzawa et al. | |
| 2007/0297486 | A1 * | 12/2007 | Landis et al. | 374/185 |
| 2009/0151859 | A1 | 6/2009 | Landis et al. | |

FOREIGN PATENT DOCUMENTS

| | | |
|---|---|---|
| JP | 2000-266609 | 9/2000 |
| JP | 2004-317499 | 11/2004 |
| WO | WO 2006/030074 | 3/2006 |
| WO | WO 2007/112434 | 10/2007 |

OTHER PUBLICATIONS

Partial European Search Report dated Sep. 4, 2009, issued in corresponding European Application No. 08151922.5-1236.
Japanese Office Action dated Feb. 24, 2009, issued in corresponding Japanese Application No. 2007-046769, with English translation.
Extended European Search Report dated Nov. 25, 2009, issued in counterpart European Application No. 08151922.5-1236.

* cited by examiner

*Primary Examiner*—Gail Verbitsky
*Assistant Examiner*—Mirellys Jagan
(74) *Attorney, Agent, or Firm*—Nixon & Vanderhye PC

(57) ABSTRACT

In a temperature sensor having a temperature sensitive element, a sheath pin connected to the temperature sensitive element, and a cover case. The cover case, filled with a filler, accommodates the temperature sensitive element and the sheath pin. A hardening temperature of the filler is not less than an actual usage environment of the temperature sensor. Another temperature sensor has a temperature sensitive element exposed at a high temperature of not less than 750° C., a thermistor element, a sheath pin, an anti-vibration filler, and a metal cover case fixed to an end part of the sheath pin. The metal cover case accommodates the sheath pin and the thermistor element. The filler is made of a porous insulation material having a pore ratio within a range of 30 to 70% and filled around the thermistor element in the metal cover case.

7 Claims, 15 Drawing Sheets

COMPARISON EXAMPLE

FIG. 18A

OXIDE SEMICONDUCTOR

CRYSTAL STRUCTURE
ABO₃

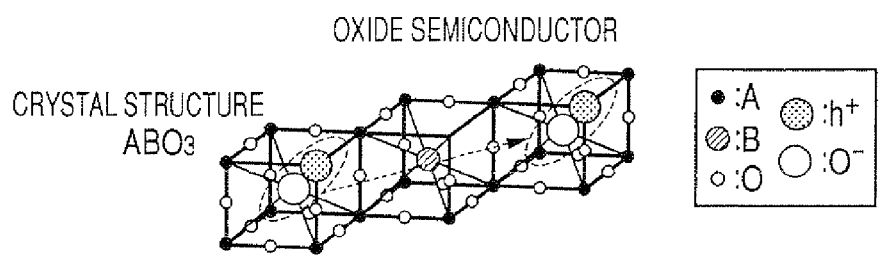

FIG. 18B

TEMPERATURE SENSITIVE ELEMENT

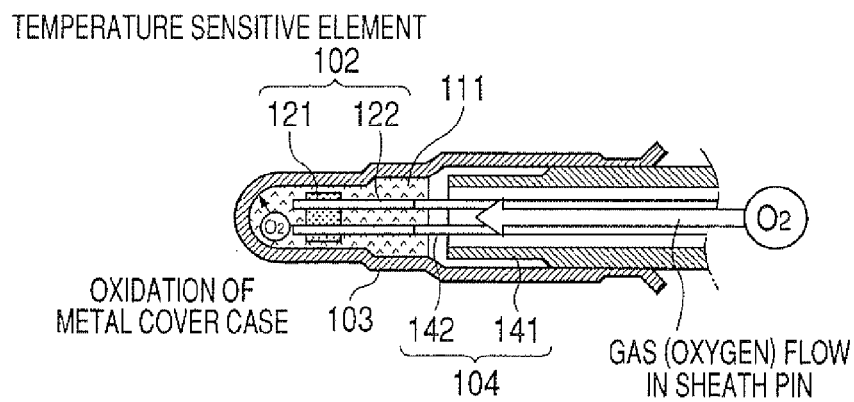

OXIDATION OF METAL COVER CASE

GAS (OXYGEN) FLOW IN SHEATH PIN

FIG. 18C

PARTIAL PRESSURE OF OXYGEN ∝ RESISTANCE

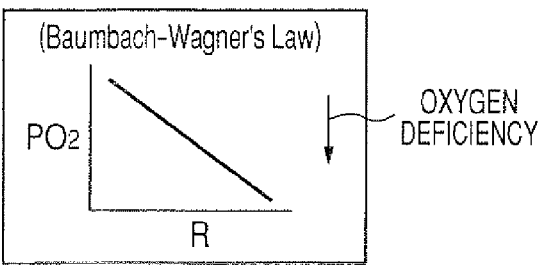

(Baumbach-Wagner's Law)

OXYGEN DEFICIENCY

HOLES DISAPPEAR WHEN OXYGEN IS CAPTURED → INCREASING ELECTRICAL RESISTANCE VALUE

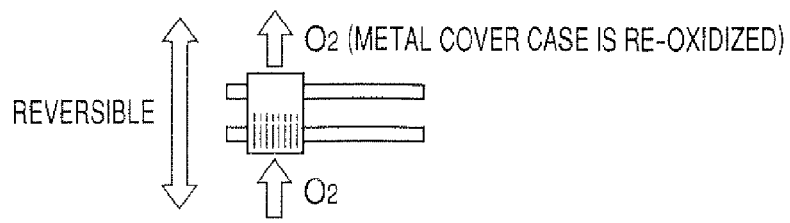

O₂ (METAL COVER CASE IS RE-OXIDIZED)

REVERSIBLE

HOLES ARE GENERATED WHEN OXYGEN IS SUPPLIED → DECREASING RESISTANCE VALUE

TEMPERATURE SENSOR AND METHOD OF PRODUCING THE TEMPERATURE SENSOR

CROSS-REFERENCE TO RELATED APPLICATION

This application is related to and claims priority from Japanese Patent Applications No. 2007-46769 filed on Feb. 27, 2007 and No. 2007-51215 filed on Mar. 1, 2007, the contents of which are hereby incorporated by reference.

BACKGROUND OF THE INVENTION

1. Field of the Invention

The present invention relates to a temperature sensor and a method of producing the temperature sensor, which is installed in an exhaust gas system, capable of detecting the temperature of the exhaust gas in an exhaust gas pipe emitted from for an internal combustion engine.

2. Description of the Related Art

There is known a temperature sensor installed in the exhaust gas pipe in the exhaust gas system for an internal combustion engine. Such temperature sensor is equipped with a temperature sensitive element. The temperature sensitive element is capable of changing its electrical characteristics according to the magnitude of the ambient temperature. Such a temperature sensor is configured of a temperature sensitive element, a sheath pin with a pair of built-in signal wires connected to electrodes of the temperature sensitive element, and a front cover case placed at the front of the temperature sensitive element. The temperature sensitive element is covered with the cover case.

A filler composed of a filling material is filled between the temperature sensitive element and the cover case in order to fix and support the temperature sensitive element. For example, Japanese patent laid open publication No. JP 2004-317499 has disclosed a temperature sensor having such a configuration. There is a cement material as the filler. The hardening temperature of the cement material of the filler is approximately 150° C. Because the temperature sensitive element in the temperature sensor is fixed to and supported by the cover case using the cement material of the filler, it is possible to prevent the temperature sensitive element in the cover case from the influence of vibration even if the vibration is propagated from the internal combustion engine. This can also prevent the temperature sensor from suffering serious damage caused by strong vibration or objects colliding with the temperature sensitive element and the cover case, which could break the signal wiring. However, when the temperature sensor is placed in the exhaust gas pipe, in which an exhaust gas of a temperature range of 600 to 700° C. flows, in the exhaust gas system for the internal combustion engine of a vehicle, there is a possibility of causing a gap to open between the cover case and the filler by a difference in thermal expansion coefficient between the cover case made of a stainless steel and the filler made of a cement material. FIG. 6 shows such a state. The generation of a gap in the cover case deteriorates the function of the filler, namely, the function of fixing and supporting the temperature sensitive element to the cover case and protecting the temperature sensitive element from the influence of vibration. The vibration further causes breaking of the filler with serious damage in the temperature sensitive element, and also breaking the electrodes of the temperature sensitive element.

By the way, the temperature sensor equipped with a thermistor element has been widely used in various control operations such as a fuel injection control and an exhaust gas purifying control in an internal combustion engine of a vehicle. For example, such a temperature sensor, which is equipped with a thermistor element as a temperature sensitive element, is fixed to and supported by the wall of the exhaust gas pipe so that the temperature sensitive element is projected into the inside of the exhaust gas pipe in which the exhaust gas flows. The temperature sensor detects the temperature of the exhaust gas which flows in the exhaust gas pipe, and outputs a detection signal corresponding to the detected temperature of the exhaust gas. The detection signal is transferred to an outside device such as a vehicle ECU (electric control unit) through a rear side of the temperature sensor which is projected to the outside of the exhaust gas pipe. In general, lead wires of the thermistor element as the temperature sensitive element are electrically connected to metal core wires of sheath pins built into a metal cover of the temperature sensor, and the temperature sensitive element is accommodated in the metal cover. The temperature sensitive element detects the temperature of the exhaust gas flowing in the exhaust gas pipe based on the electrical resistance change of the thermistor element.

In order to accurately control the temperature of the catalyst placed in the exhaust gas pipe, based on the temperature of the exhaust gas flowing in the exhaust gas pipe, the temperature sensor is required to maintain stable characteristics, when in use and to reliably detect the temperature of the exhaust gas flowing in the exhaust gas pipe.

Japanese patent laid open publication No. JP 2004-317499, as one of related art techniques, has disclosed a temperature sensor having an improved responsiveness. It is preferable to decrease the distance measured from the front end part of the metal cover case to the front end part of the temperature sensitive element in the temperature sensor as much as possible. In the temperature sensor, a gap or space formed between the metal cover case and the temperature sensitive element is filled with a filler, in particular, having a filling density of not less than 75% in the gap. The temperature sensor is required to rapidly conduct the heat energy of the exhaust gas, as a detection target, to the temperature sensitive element through the metal cover case.

Also, the influence of vibration on the temperature sensitive element in the temperature sensor must be considered when the temperature sensor is used under severe conditions. There may be a large amount of vibration at high temperature, for example, in an engine exhaust gas system. In particular, breaking of the electrode wires of the temperature sensitive element by vibration caused by an internal combustion engine and the like must be considered, especially, when the electrodes of the temperature sensitive element are made of metal such as platinum (Pt) or Pt based alloy in order to have a high thermal resistance. In order to avoid this, the filler is filled around the thermistor element in the temperature sensor in order to avoid displacement of the thermistor element in the temperature sensor and to increase the vibration resistance function of the temperature sensor.

Recently, better automobile exhaust emissions control has been required and the temperature sensors are also required to have high temperature resistance, for example, to withstand not less than 900° C. because of being placed in the exhaust gas pipe of the exhaust gas system of an internal combustion engine. However, when the ambient temperature of the temperature sensor with the filler, in the metal cover case, in order to increase its vibration resistance, is not less than 750° C., the characteristics of the thermistor element become unstable. In particular, there is a tendency that the temperature sensor becomes unstable when the temperature sensor equipped with built-in thermistor element made of oxide semiconductor has a high filler density. Such a temperature sensor cannot provide a stable output characteristic, namely, cannot output a stable detection signal to the outside devices such as an ECU.

SUMMARY OF THE INVENTION

It is an object of the present invention to provide a temperature sensor equipped with a built-in temperature sensitive element capable of protecting the temperature sensitive element in a cover case from the effects of vibration.

Another object of the present invention is to provide a temperature sensor with high reliability capable of detecting the temperature of the target gas with high reliability, and capable of maintaining stable detection signal output characteristics, even under high temperature and vibration conditions, for example, in the exhaust gas system for an internal combustion engine, and further capable of providing a high thermal resistance, improved vibration resistance, and high responsiveness without wiring breaking in the temperature sensitive element.

In accordance with one aspect of the present invention, there is provided a temperature sensor comprised of a temperature sensitive element, a sheath pin, a cover case, and a filler. An electrical characteristic of the temperature sensitive element changes based on the ambient gas temperature. The sheath pin accommodates the temperature sensitive element so that a pair of electrodes of the temperature sensitive element is exposed at a front part of the sheath pin. A pair of the electrodes of the temperature sensitive element is electrically connected to a pair of signal wires (or metal core wires) of the sheath pin. The cover case is placed at the front end part of the temperature sensor. The temperature sensitive element is embedded in the cover case at the front end part of the temperature sensor. The filler is made of a material whose hardening temperature is not less than the temperature of the usage environment. The filler is located between the temperature sensitive element and the cover case in order to tightly fix the temperature sensitive element to the cover case.

In the temperature sensor according to the present invention, the hardening temperature of the filler is not less than the temperature of the usage environment, for example, not less than the temperature of an exhaust gas emitted from an internal combustion engine. This feature avoids a generation of a gap between the filler and the cover case, for example, by vibration during actual usage of the temperature sensor. That is, the filler raw material is disposed in the cover case in which the temperature sensitive element is also inserted and placed. Following this, thermal treatment is carried out in order to harden the filler in the cover case. After the temperature sensor is cooled to room temperature, because the cover case's thermal expansion coefficient is larger than that of the filler, the cover case shrinks so that the cover case is tightly adhered to the filler by applying a compressive stress from the cover case to the filler. Because the temperature sensor of the present invention is used under an actual usage environment at a temperature which is lower than the hardening temperature of the filler, the inner diameter of the cover case is not larger than the outer diameter of the filler after completion of the thermal treatment. That is, no gap is generated between the cover case and the filler even under actual usage. In other words, because the filler supporting the temperature sensitive element tightly adheres to the cover case, it is possible to avoid a collision of the temperature sensitive element with the filler by vibration, even if, propagated from an internal combustion engine to the temperature sensor. As a result, the temperature sensitive element in the temperature sensor having the above configuration can escape damage and the electrodes of the temperature sensitive element also escape breaking.

As described above, according to the present invention, it is possible to provide a temperature sensor capable of avoiding breakage of the electrodes and lead wires and avoiding vibration collisions between the temperature sensitive element and the filler in the cover case even under an actual usage environment.

In accordance with another aspect of the present invention, there is provided a method of producing the temperature sensor described above. In this method, the filler is injected into the inside of the cover case while the temperature sensitive element is being placed in the cover case. A thermal treatment is carried out in order to harden the filler in the cover case, at a temperature of not less than the temperature of the actual usage environment of the temperature sensor.

In this method of producing the temperature sensor, it is so set that the hardening temperature of the filler is not less than the temperature of actual usage of the temperature sensor. This avoids generation of a gap between the filler and the cover case when in use. As a result, it is possible to provide a temperature sensor capable of avoiding damage from vibration of the temperature sensitive element in the cover case in an actual usage environment, and of avoiding breaking the electrode wires of the temperature sensitive element.

The temperature sensor according to the present invention is used for detecting the temperature of the exhaust gas in the exhaust gas system for an internal combustion engine and the like, for example. The temperature sensor according to the present invention is inserted into and placed in the inside of an exhaust gas pipe. In the temperature sensor, the temperature sensitive element is placed at a front end part of the temperature sensor. A rear end part is an opposite end part of the front end part. The temperature sensitive element is comprised of a thermistor element capable of changing its electrical resistance value based on an ambient temperature. The cover case is made of a stainless steel, for example. The thermal expansion coefficient of the stainless steel is larger than that of the filler.

In the temperature sensor as another aspect of the present invention, a pair of the electrodes of the temperature sensitive element is made of platinum and a platinum based material having a superior corrosion resistance. The platinum based material is one of Pt—Rh, Pt—Ir, Pt—Ni, Pt—W, and the like.

In the temperature sensor as another aspect of the present invention, the hardening temperature of the filler is not less than 600° C. It is possible to avoid generation of a gap between the cover case and the filler when the ambient temperature in an actual usage environment is not less than 600° C. Because the strength of the electrodes made of platinum or a platinum based material is decreased when the ambient temperature is not less than 600° C., it is necessary to protect the temperature sensitive element from vibration, in particular, at a temperature of not less than 600° C.

Because the present invention provides the temperature sensor having the filler whose hardening temperature is not less than 600° C., it is possible to avoid generation of a gap between the cover case and the filler. As a result, it is possible to reliably avoid the generation of damage in the temperature sensitive element and breaking of the electrode wires.

In the temperature sensor as another aspect of the present invention, the temperature sensitive element is composed of the thermistor element and the filler is made mainly of alumina. This configuration can provide a small difference in thermal expansion coefficient between the temperature sensitive element and the filler. It is thereby possible to decrease the magnitude of the stress which is applied between the filler and the temperature sensitive element and possible to promptly transfer the thermal energy of the exhaust gas, flowing around the outer surface of the cover case, to the temperature sensitive element while the temperature sensor is used in a hostile environment. As a result, it is possible to increase both the durability of the temperature sensitive element and the responsiveness of the temperature sensor.

In the method as another aspect of the present invention, a pair of the electrodes of the temperature sensitive element is made of platinum or a platinum based material, and the hardening temperature of the filler is not less than 600° C. This can maintain the durability of the electrodes of the temperature sensitive element and reliably avoid breaking of the electrodes.

In the method as another aspect of the present invention, the filler is made of a filler raw material whose average particle size is within a range of 1 µm to 4 µm. This can avoid shrinkage of the filler during the thermal treatment to harden the filler raw material, and can maintain adequate strength of the filler. It is thereby possible to fill the high strength filler into the cover case without generation of a gap between the filler and the cover case. If the average particle size of the filler raw material were to be less than 1 µm, the filler would shrink during the thermal treatment and this would generate a gap between the filler and the cover case.

On the contrary, when the average particle size of the filler raw material of the filler exceeds 4 µm, it is difficult for the filler to have adequate strength. The average particle size of the filler raw material can be measured using a particle size analyzer or an electron microscope. On using such a particle size analyzer, the diameter of each particle of the filler raw material is calculated based on a diameter of a sphere (or a ball) whose volume is equal to the diameter of a particle of the raw material. It is also possible to prepare the raw material having a uniform particle size (or a diameter) using a sieve.

In the temperature sensor as another aspect of the present invention, the filler is made of a slurry obtained by mixing solid material and water of 15 to 25 wt % as a solvent. This enables the filler to be filled into the cover case without any generation of a gap between the cover case and the filler. Because the viscosity of the slurry becomes high when the amount of water contained in the slurry is less than 15%, it becomes difficult to fill the slurry into the cover case. On the other hand, if the amount of water contained in the slurry exceeded 25%, a gap would be generated between the cover case and the filler after completion of the thermal treatment because the filler would shrink in the cover case.

In accordance with another aspect of the present invention, there is provided a temperature sensor comprised of a temperature sensitive element, a sheath pin, a metal cover case, and a anti-vibration filler. The temperature sensitive element is exposed under an actual usage environment at a temperature of not less than 750° C. and is composed of a thermistor element for detecting the ambient gas temperature such as an exhaust gas emitted from an internal combustion engine. The sheath pin is electrically connected to the thermistor element and through which a detection signal of the thermistor element is output. The metal cover case is fixed to a front end part of the sheath pin. The metal cover case accommodates both of the sheath pin and the thermistor element. The anti-vibration filler is made of a porous insulation material having a pore ratio within a range of 30 to 70%. The anti-vibration filler is filled around the thermistor element in the metal cover case. One of main factors which cause unstable characteristic of the temperature sensor is oxidation of the metal cover case under a high temperature of not less than 750° C., for example, the temperature of an exhaust gas in the actual usage environment. Another factor causing unstable characteristics is the change of partial pressure of oxygen surrounding the thermistor element. This means the change of a chemical composition of the thermistor element. The thermistor element develops thereby unstable temperature-resistance characteristics.

On the contrary, the temperature sensor according to the present invention has an anti-vibration filler made of porous insulation material having a pore ratio of not less than 30%. This has a gas permeability capable of suppress the fluctuation of the partial pressure of oxygen. Still further, using the anti-vibration filler having the pore ratio of not more than 70% can provide a high responsiveness and high anti-vibration capability.

Accordingly, even if the temperature sensor of the present invention is placed and used under a hostile environment, for example, at high temperature under a strongly-vibrating condition such as an exhaust gas system for an internal combustion engine of a vehicle, the thermistor element can keep and provide its stable characteristic with a high responsiveness and can detect the ambient temperature with high accuracy without causing any failure such as breaking of various electrical wires in the temperature sensor.

In the temperature sensor as another aspect of the present invention, the sheath pin is composed of a cylindrical metal case and a pair of metal wiries which are insulated from each other in the cylindrical metal case, and has a gas permeability function in its axial direction. It is thereby possible to easily connect the sheath pin to the thermistor element while maintaining adequate gas permeability supplied to the temperature sensitive element and keeping its stable characteristics.

In the temperature sensor as another aspect of the present invention, a pair of metal wires in the sheath pin project at an end part of the sheath pin along its axial direction and electrically connect to a pair of lead wires of the thermistor elements, and the anti-vibration filler is filled in the metal cover case so that connection nodes between the metal wires and the lead wires and the thermistor element are filled with the anti-vibration filler.

Specifically, the thermistor body of the thermistor element is covered with the anti-vibration filler in order to avoid breaking of the electrodes caused by vibration. This configuration avoids the wires of the electrodes of the thermistor element from breaking. In addition, it is possible to keep the anti-vibration function at the connection node between the metal core wires and the lead wires while keeping the electrical insulation between those wires.

In the temperature sensor as another aspect of the present invention, the thermistor element is mainly of an oxide semiconductor. Specifically, the thermistor element is made of an oxide semiconductor or a material composed of an oxide semiconductor. Although the oxide semiconductor generally changes its temperature-resistance characteristic based on the partial pressure of oxygen contained in an ambient atmospheric gas, the configuration of the temperature sensor according to the present invention having a superior gas permeability to supply oxygen into the thermistor element can provide the stable characteristics of the oxide semiconductor forming the thermistor element.

In the temperature sensor as another aspect of the present invention, the anti-vibration filler has a pore ratio within a range of 40 to 60%. The configuration of the anti-vibration filler having the pore ratio within a range of 40 to 60% can enhance the stable characteristic of the temperature sensitive element composed of the thermistor element and its anti-vibration function.

In the temperature sensor as another aspect of the present invention, the anti-vibration filler has a specific pore ratio within a range of 45 to 55%. This configuration further enhances both of the stable characteristic and the anti-vibration function.

In the temperature sensor as another aspect of the present invention, the outer diameter of the metal cover case is within a range of φ1.0 mm to φ3.0 mm, more preferably within a range of φ1.0 mm to φ2.5 mm, and the depth in the axial direction of the anti-vibration filler filled in the metal cover case is within a range of 1.0 mm to 15.0 mm, more preferably within a range of 1.0 mm to 10.0 mm. Such a small-sized metal cover case further improves the responsiveness of the temperature sensitive element while maintaining the anti-vibration function because it allows the anti-vibration filler of a small volume to be filled in the metal cover case.

BRIEF DESCRIPTION OF THE DRAWINGS

A preferred, non-limiting embodiment of the present invention will be described by way of example with reference to the accompanying drawings, in which:

FIG. 18A is a diagram showing a model of an oxide semiconductor forming a thermistor element in a temperature sensor;

FIG. 18B is a schematic cross section showing the relationship between gas flow in a temperature sensitive element and oxidation of the metal cover case in a temperature sensor;

FIG. 18C is a diagram showing the relationship between partial pressure of oxygen and electrical resistance;

DETAILED DESCRIPTION OF THE PREFERRED EMBODIMENTS

Figure 1:
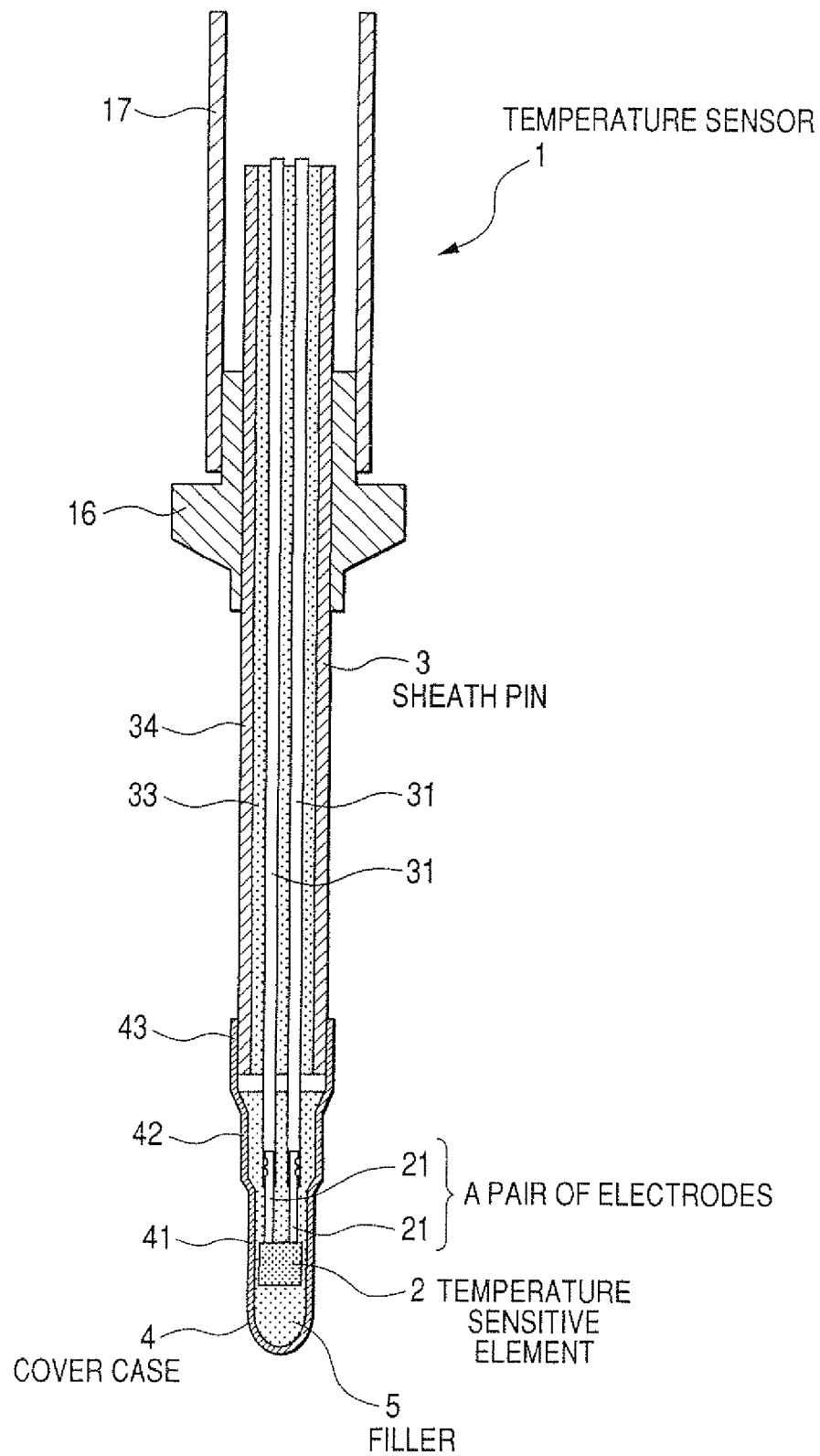
FIG. 1 is a longitudinal cross section of a temperature sensor according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a temperature sensor and a method of producing the temperature sensor according to a first embodiment of the present invention with reference to FIG. 1 to FIG. 4.

FIG. 1 is a longitudinal cross section of the temperature sensor 1 according to the first embodiment of the present invention.

As shown in FIG. 1, the temperature sensor 1 of the first embodiment is comprised of a temperature sensitive element 2, a sheath pin 3, and a front cover case 4 (hereinafter, referred to as the "cover case 4"). The sheath pin 3 has a pair of built-in signal wires 31 connected to a pair of electrodes 21 of the temperature sensitive element 2. The cover case 4 is placed at the front of the temperature sensitive element 2. The temperature sensitive element 2 is covered with the cover case 4. The temperature sensitive element 2 changes its electrical characteristic based on the ambient temperature. A front part of the built-in signal wires 31 in the sheath pin 3 is exposed at the front of the sheath pin 3. The exposed front part of the sheath pin 3 is accommodated in the cover case 4. The space between the temperature sensitive element 2 and the cover case 4 is filled with a filler 5. The hardening temperature of the filler 5 is not less than the temperature under actual usage.

The temperature sensor 1 of the first embodiment is used at a temperature within a range of 600 to 700° C. in the exhaust gas system for an internal combustion engine of a motor vehicle. The filler 5 hardens at a temperature of 900° C. which is more than the temperature of the temperature sensor of actual usage environment.

The temperature sensitive element 2 is composed of a thermistor element. The filler 5 is composed mainly of alumina ($Al_2O_3$). A pair of the electrodes 21 of the temperature sensitive element 2 are made of Pt. The cover case 4 is made of stainless steel.

As shown in FIG. 1, the sheath pin 3 is comprised of a pair of the signal wires 31, an insulation part 33, and an outer tube 34. A pair of the signal wires 31 is made of stainless steel. The insulation part 33 is made of insulation material powder such as magnesium oxide (MgO) placed around the signal wires 31. The outer tube 34 is made of stainless steel covering the outer periphery of the insulation part 33. A rib 16 supports the sheath pin 3. The rib 16 is fixed to the outer periphery of the outer tube 34. A protection tube 17 is fixed to the rear end part of the rib 16. The protection tube 17 protects the sheath pin 3 and a lead (not shown) connected to the rear end part of the sheath pin 3.

The cover case 4 is fitted into the outer periphery at the front of the outer tube 34 of the sheath pin 3 by welding.

Figure 2:
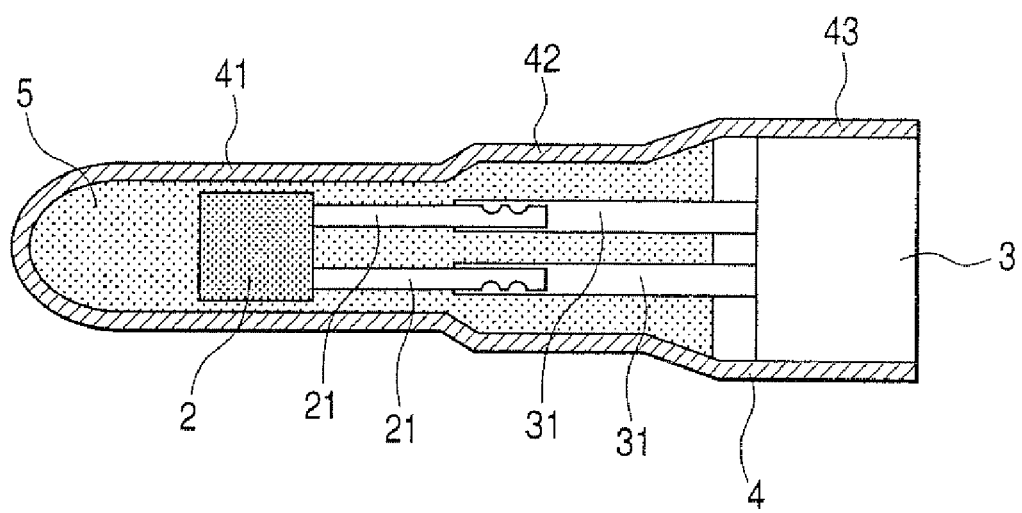
FIG. 2 is a longitudinal cross section of a temperature sensitive element and its boundary area in a cover case in the temperature sensor according to the first embodiment of the present invention.

FIG. 2 is a longitudinal cross section of the temperature sensitive element 2 and its boundary area in the cover case 4 in the temperature sensor 1 according to the first embodiment of the present invention.

As shown in FIG. 2, the cover case 4 has three sections composed of a large diameter part 43, a small diameter part 41, and a middle diameter part 42. The large diameter part 43 is fitted to the sheath pin 3. The small diameter part 41 is placed at the outer periphery of the temperature sensitive element 2. The middle diameter part 42 is formed between the large diameter part 41 and the small diameter part 43.

The front part of the small diameter part 41 in the cover case 4 is sealed and has an approximately spherical shape. The filler 5 is also filled to a boundary part between the middle diameter part 42 and the large diameter part 43.

In the method of filling the filler 5 in the space between the temperature sensitive element 2 and the cover case 4, a raw material of the filler 5 is injected into the inside of the cover case 4 while the temperature sensitive element 2 is embedded in the cover case 4. The cover case 4, in which the temperature sensitive element 2 is built in with the filler 5, is hardened at a temperature of not less than the temperature of an actual usage environment of the temperature sensor 1. In the first embodiment, the hardening temperature of the filler 5 in the cover case 4 is 900° C. The filler 5 is made of a filler slurry and water as a solvent, which are mixed. Such water to be added to the slurry is approximately within a range of 15 wt % to 25 wt %. That is, the filler slurry is used as the raw material of the filler 5. The slurry is made by mixing alumina (50 wt %) as a main raw material, an additive, a dispersing agent, and the like. Water as the solvent is then added into the mixture.

The additive is capable of promoting the combination of alumina particles during the thermal treatment in which the filler 5 is fired. For example, the additive is one of or a combination of CaCO3, kaolin, talc, boracic acid ($H_3BO_3$), and the like. There is Ceramo (manufactured by Dai-ichi Kogyo Seiki Co., Ltd.) as the dispersing agent.

The alumina particles as the main component of the filler 5 have an average particle size within a range of 1 to 4 μm.

Next, a description will now be given of the action and effects of the temperature sensor 1 according to the first embodiment of the present invention.

The hardening temperature of the filler 5 in the temperature sensor 1 is not less than the temperature of an actual usage environment of the temperature sensor 1. This can avoid generation of a gap between the filler 5 and the cover case 4 even if the temperature sensor vibrates in the actual usage environment of the temperature sensor 1, for example, in the exhaust gas system for an internal combustion engine of a vehicle.

That is, in the step of filling the filler 5 into the space between the temperature sensitive element 2 and the cover case 4, a raw material of the filler 5 is firstly injected into the gap in the cover case 4, a thermal treatment is then carried out in order to harden the filler 5.

Figure 3:
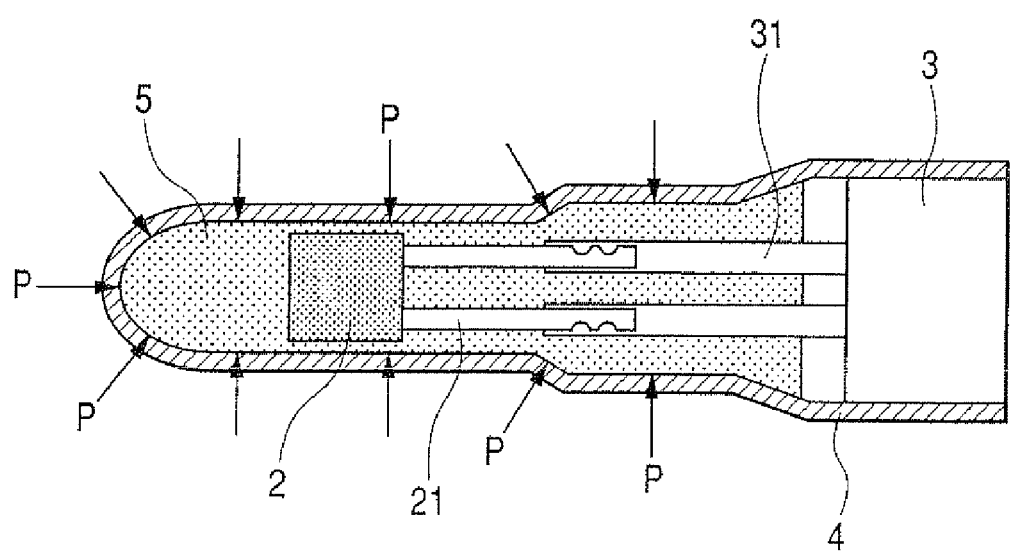
FIG. 3 is an explanatory diagram showing a compression stress applied from the cover case to a filler in the boundary area of the temperature sensitive element in the temperature sensor according to the first embodiment of the present invention.

FIG. 3 is an explanatory diagram showing a compressed stress P applied from the cover case 4 to the filler 5 in the boundary area of the temperature sensitive element 2 in the temperature sensor 1 according to the first embodiment of the present invention. On cooling the filler 5, namely, decreasing the temperature of the filler 5 to room temperature (RT), the cover case 4 with a large thermal expansion coefficient different to that of the filler 5 shown in FIG. 3, is adhered to the filler 5 in a direction to which the cover case 4 tightens the filler 5 by the compressed stress P. In the first embodiment, the filler 5 and the cover case 4 have the thermal expansion coefficients, $8 \times 10^{-6}/°$ C. and $17 \times 10^{-6}/°$ C., respectively.

Because the temperature sensor 1 is exposed at a temperature (within a range of 600 to 700° C.) of not more than the hardening temperature (900° C.) of the filler 5 under actual usage, the inner diameter of the cover case 4 does not exceed the outer diameter of the filler 5. This feature can prevent generation of a gap between the cover case 4 and the filler 5. That is, because the filler 5 supporting the temperature sensitive element 2 in the cover case 4 keeps tightly gripping the cover case 4, the temperature sensitive element 2 and the cover case 4 vibrate together while keeping tightly bounded even if the vibration of the internal combustion engine of the vehicle is propagated to the temperature sensor 1. As a result, it is possible to avoid damage of the temperature sensitive element 2 in the temperature sensor 1 caused by the vibration propagating from the internal combustion engine to the temperature sensor, and further to avoid breaking of the electrodes 21 of the temperature sensitive element 2.

This feature will now be explained with reference to FIG. 4.

Figure 4:
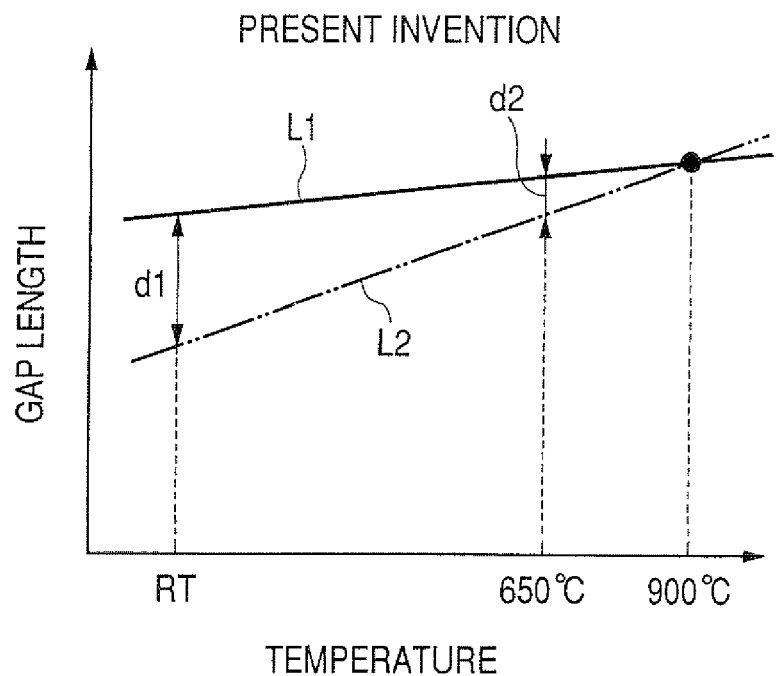
FIG. 4 is a diagram showing a relationship between the outer diameter of the filler and the inner diameter of the cover case in the temperature sensor of the first embodiment of the present invention while changing the ambient temperature.

FIG. 4 is a diagram showing the relationship in dimension between the outer diameter of the filler 5 and the inner diameter of the cover case 4 in the temperature sensor 1 as the first embodiment of the present invention, in response to an ambient temperature change. The filler 5 is made of cement having a hardening temperature of 900° C. In particular, in FIG. 4, the solid line L1 indicates the outer-diameter change of the filler 5, and the dotted line L2 designates the inner-diameter change of the cover case 4 in the temperature sensor 1 based on the ambient temperature change. In particular, FIG. 4 shows the dimension change under the condition where the cover case 4 and the filler 5 are in isolation.

As shown in FIG. 4, at the hardening temperature of 900° C. of the filler 4 in the cover case of the temperature sensor 1, the dimension of the outer diameter of the filler 5 is just equal to the inner diameter of the cover case 4. When the temperature sensor 1 is cooled until room temperature RT after completion of the thermal treatment, each diameter is gradually decreased based on the decrease of the ambient temperature. At this time, because the thermal expansion coefficient of the cover case 4 is larger than that of the filler 5, the inner diameter of the cover case 4 is smaller than the outer diameter of the filler 5 by a dimension d1 under the assumption where the filler 5 does not affect the cover case 4. In actual case, because the filler 5 is filled in the cover case 4, the dimension of the outer diameter of the filler 5 is equal to the inner diameter of the cover case 4, and the cover case 4 tightens the filler 5 by the compressive stress.

On the use of the temperature sensor 1 in an exhaust gas system for an internal combustion engine of a vehicle, the cover case 4 provides such a compressive stress to the filler 5 under the condition in which the ambient temperature does not exceed the hardening temperature 900° C., and as a result no gap is generated between the cover case 4 and the filler 5. For example, because the inner diameter of the cover case 4 is smaller than the outer diameter of the filler 5 by d2, as shown in FIG. 4, under the ambient temperature of 650° C. and the assumption where the cover case 4 and the filler 5 are not affected to each other, the cover case 4 presses and tightens the filler 5 by the compressed stress. Thus, no gap is generated between the cover case 4 and the filler 5 at any temperature under actual usage of the temperature sensor 1.

Further, because the pair of the electrodes 21 in the temperature sensitive element 2 is made of platinum (Pt), the electrode 21 has a superior anti-corrosion function.

Still further, because the hardening temperature of the filler 5 is 900° C., it is possible to avoid generation of a gap between the cover case 4 and the filler 5 even if the ambient temperature of the temperature sensor 1 is not less than 600° C. under an actual usage environment.

When the ambient temperature exceeds 600° C. (in a fourth embodiment shown in FIG. 13, which will be explained later), the strength of the electrodes 21 made of platinum (Pt) is decreased, namely, deteriorated, and it is necessary to protect the temperature sensitive element 2 from an applied vibration under in particular an ambient temperature of not less than 600° C. Accordingly, because the hardening temperature of the filler 5 is 900° C., it is possible to avoid a generation of a gap between the cover case 4 and the filler 5 even if the ambient temperature is not less than 600° C. That is, it is possible to avoid damage to the temperature sensitive element 2 in the temperature sensor 1 and to avoid a breaking of the wiring of the temperature sensitive element 2.

Still further, because the temperature sensitive element 2 is composed of a thermistor element and the filler 5 is made mainly of alumina, it is possible to have a small difference in thermal expansion between the temperature sensitive element 2 and the filler 5, and in addition, to have a high thermal conductivity of the filler 5. It is thereby possible to suppress the stress to be applied to both of the filler 5 and the temperature sensitive element 2 under actual usage of the temperature sensor 1, and in addition, to directly and rapidly conduct the thermal energy around the outer periphery of the cover case 4 to the temperature sensitive element 2. This can increase the durability and responsiveness capability of the temperature sensitive element 2 in the temperature sensor 1.

Still further, the alumina particles as the main component of the filler 5 have an average particle size within a range of 1 μm to 4 μm. It is thereby possible to avoid shrinkage of the filler 5 during the thermal treatment when the filler 5 is hardened as well as being possible to keep the strength of the filler 5. This can provide the high strength filler 5 in the cover case 4 without a gap therein.

Still further, because the filler 5 is made of a slurry raw material containing water of 15 to 25 wt %, it is possible to easily fill the filler 5 into the cover case 4 without a gap.

As described above in detail, the first embodiment of the present invention can provide the temperature sensor and the method of producing the temperature sensor, capable of protecting the temperature sensitive element 2 in the cover case 4 from the influence of vibration caused in an actual usage environment.

COMPARISON EXAMPLE

Figure 5:
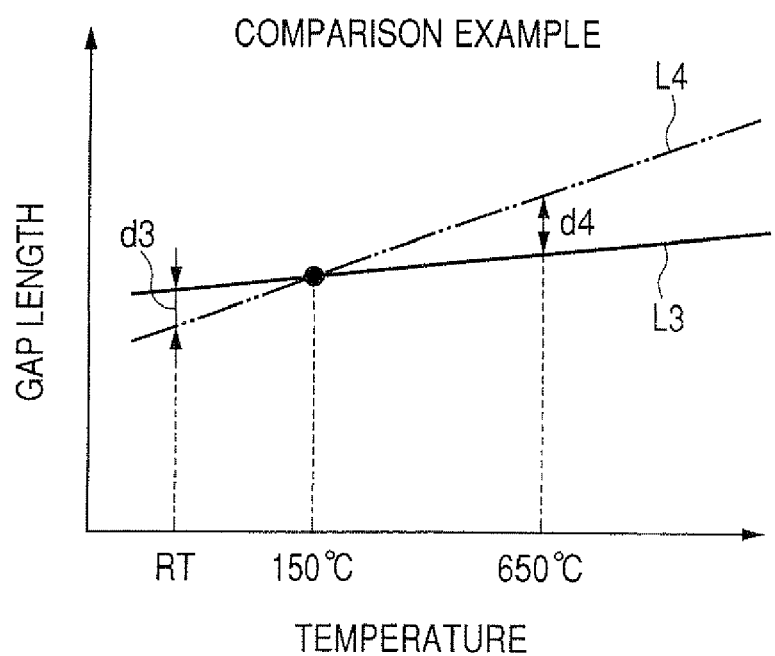
FIG. 5 is a diagram showing a relationship between the outer diameter of a filler and the inner diameter of the cover case in a temperature sensor as a comparison example while changing the ambient temperature.

FIG. 5 is a diagram showing the relationship in dimension between the outer diameter of a filler 95 and the inner diameter of the cover case, in a temperature sensor as a comparison example, as a function of ambient temperature change. The filler 95 is made of cement whose a hardening temperature is 150° C. In FIG. 5, the solid line L3 indicates the change of the outer diameter of the filler 95, and the dotted line L4 designates the change of the inner diameter of the cover case in the comparison example temperature sensor as the ambient temperature changes.

Figure 6:
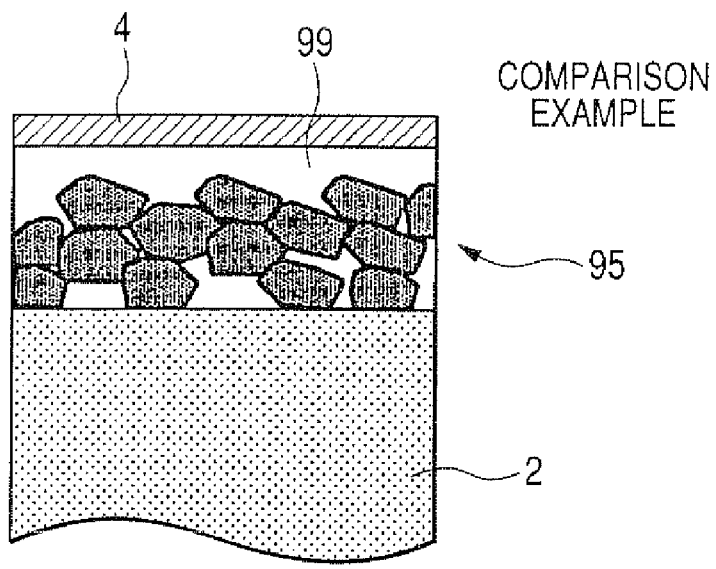
FIG. 6 is an explanatory diagram showing the gap between the cover case and the filler in the temperature sensor in the comparison example.

FIG. 6 is an explanatory diagram showing the gap between the cover case and the filler 95 in the temperature sensor in the comparison example. After a temperature sensitive element is inserted and placed in the cover case while injecting a filler raw material into the inside of the cover case 4, the filler 95 in the cover case is hardened at a temperature of 95° C., and then gradually cooled to room temperature (RT). Such a temperature sensor as the comparison example having the filler 95 is used within a temperature range of 600 to 700° C. in an actual usage environment. The outer diameter of the filler 95 and the inner diameter of the cover case in the temperature sensor as the comparison example are changed due to the ambient temperature change.

FIG. 5 shows the change of the outer diameter of the filler 95 and the inner diameter of the cover case of the temperature sensor as the comparison example under the assumption that the filler 95 and the cover case in the temperature sensor are not affected by each other.

As shown in FIG. 5, the outer diameter of the filler 95 is equal in dimension to the inner diameter of the cover case at the hardening temperature of 150° C.

After completion of the thermal treatment, the temperature sensor 1 is gradually cooled until room temperature RT. At this time, both of the outer diameter of the filler 95 and the inner diameter of the cover case are gradually decreased. Because the cover case has a larger thermal expansion coefficient than the filler 95, the outer diameter of the filler 95 is smaller than the inner diameter of the cover case in the temperature sensor as the comparison example by a dimension d3 when the temperature of the temperature sensor reaches room temperature RT, for example. This is the result under the assumption where the filler 95 and the cover case in the temperature sensor as the comparison example are not affected by each other. Because the cover case is filled with the filler 95, the outer diameter of the filler 95 becomes equal to the inner diameter of the cover case in the temperature sensor as the comparison example. That is, the cover case tightens the filler 95 by the compressed stress from the outer periphery of the cover case to the filler 95.

In an actual usage environment of the temperature sensor 1 as the comparison example placed in an exhaust gas system of a vehicle, the ambient temperature exceeds 150° C., the inner diameter of the cover case 4 becomes greater than the outer diameter of the filler 95. This generates a gap 99 between the filler 95 and the cover case 4, as shown in FIG. 6.

When the temperature sensor as the comparison example at an ambient temperature of 650° C., as shown in FIG. 5, the inner diameter of the cover case 4 is greater than the outer diameter of the filler 95 by d4, the gap of a thickness d4/2 being generated. Thus, when the hardening temperature of the filler 95 is lower than the ambient temperature in an actual usage environment, the gap 99 is generated between them. As a result, the temperature sensor is vibrated by propagating the vibration of the internal combustion engine of the vehicle, the temperature sensitive element 2 and the filler 95 are vibrated together. There is a possibility of breaking the filler 95 by interacting with the cover case 4. This further damages the temperature sensitive element 2 and breaks the electrodes 21 of the temperature sensitive element 2.

On the contrary, according to the temperature sensor 1 of the first embodiment of the present invention, as described above in detail, there is no possibility of generating any gap between the cover case 4 and the filler 5 in the temperature sensor 1. This can protect the wires 21 of the temperature sensitive element 2 from breaking.

Second Embodiment

A description will be given of a temperature sensor and a method of producing the temperature sensor according to a second embodiment of the present invention with reference to FIG. 7 to FIG. 9.

The second embodiment of the present invention provides a preferable filler raw material to be used in producing the temperature sensor according to the present invention. The preferable filler raw material is a thermal resistance ceramic material composed mainly of one of alumina ($Al_2O_3$), silicon dioxide ($SiO_2$), magnesium oxide (MgO), and zirconium dioxide ($ZrO_2$). It is preferable to use a material as the main component of the filler 5 which has a similar thermal expansion coefficient to the temperature sensitive element 2, and also has a superior thermal conductivity. The following Table 1 shows the thermal expansion coefficient and the thermal conductivity of each raw material. The thermal expansion coefficient of the thermistor is $8 \times 10^{-6}/°$ C.

TABLE 1

| Physical | Main component | | | |
| --- | --- | --- | --- | --- |
| property | $Al_2O_3$ | $SiO_2$ | MgO | $ZrO_2$ |
| Thermal expansion coefficient ($\times 10^{-6}/°$ C.) | 8 | 1 | 13 | 14 |
| Thermal conductivity (W/m · K) | 0.47 | 0.02 | 0.25 | 0.22 |

As can be understood from Table 1, the most optimum filler raw material is alumina ($Al_2O_3$), because of having the highest thermal conductivity and a thermal expansion coefficient which is similar to that of the thermistor element. It is preferable to use Alumina as the main raw material of the filler 5 in the temperature sensor 1. The use of alumina as the main raw material of the filler 5 in the temperature sensor can suppress stress between the filler 5 and the temperature sensitive element 2, and can provide the temperature sensor 1 with a superior responsiveness.

Next, a description will now be given of an optimum particle size of alumina as the main raw material of the filler 5 in the temperature sensor of the present invention.

The filler raw material was made by mixing alumina (as a main component) and an agent which is a combination of $CaCO_3$, kaolin, talc, and boric acid. The mixture is dissolved with water in order to make a filler raw slurry.

Table 2 shows the composition ratio of the filler raw slurry.

TABLE 2

| Component | Composition ratio (wt %) |
| --- | --- |
| $Al_2O_3$ | 91.2 ± 1.5 |
| $CaCO_3$ | 3.6 ± 0.06 |
| Kaolin | 3.0 ± 0.06 |
| Talc | 1.7 ± 0.04 |
| Boric acid | 0.5 ± 0.04 |

In the composition ratio of the filler raw slurry shown in Table 2, plural filler raw slurries of a different particle size were prepared. The shrinkage ratio of each filler raw slurry was measured after completion of the thermal treatment at 900° C. for ten hours. In the thermal treatment, the temperature was gradually increased from room temperature RT to 900° C. for three hours, and maintained at 900° C. for ten hours. The temperature of the slurry was decreased from 900° C. to room temperature RT for three hours. Ten samples were prepared for each average particle size of alumina.

Figure 7:
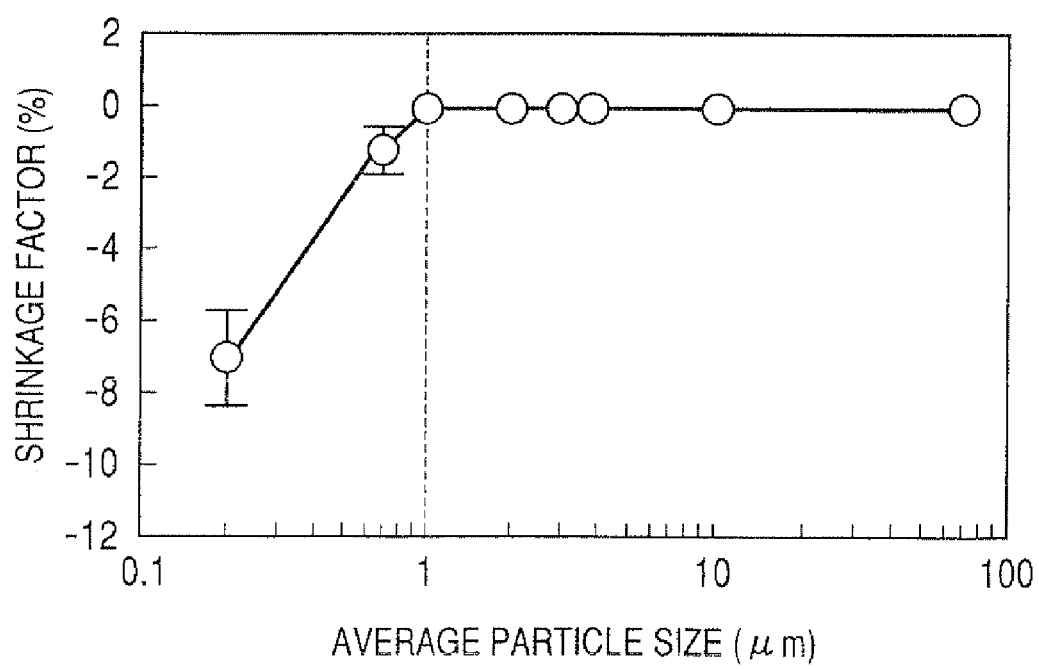
FIG. 7 is a diagram showing the relationship between average particle size of alumina and shrinkage factor of filler according to a second embodiment of the present invention.

FIG. 7 shows the measurement results of a relationship between the average particle size of alumina and the shrinkage factor of the filler. As shown in FIG. 7, when the average particle size of alumina is less than 1 µm, the filler was shrunk by firing. On the contrary, when the average particle size of alumina is not less than 1 µm, the filler was not shrunk by firing. Because the shrinkage of the filler generates a gap between the filler and the cover case, it is preferable to use alumina having its average particle size of not less than 1 µm.

Figure 8:
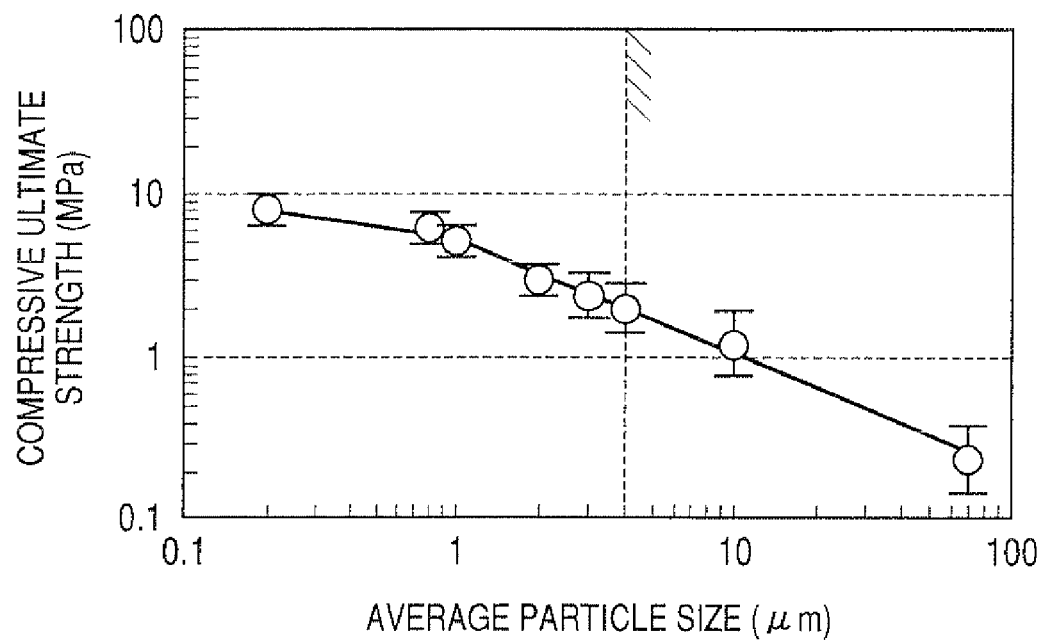
FIG. 8 is a diagram showing the relationship between average particle size of alumina and strength of the filler according to the second embodiment of the present invention.

Next, as shown in FIG. 8, relationship between the average particle size of alumina and the strength of the filler was measured. This measurement used various types of the filler raw slurry having a different particle size of alumina. The compressive stress was applied to the slurry while the magnitude of the compressive stress was gradually increased. A maximum compressive stress to break the filler was measured. Ten samples of a different particle size of alumina were prepared.

FIG. 8 is a diagram showing the relationship between the average particle size of alumina and the strength of the filler according to the second embodiment of the present invention. As clearly understood from FIG. 8, the more the average particle size of alumina is decreased, the more the strength of the filler increases. It is possible to keep the compressive ultimate strength of the filler of not less than 1 MPa when the average particle size of alumina is not more than 4 µm.

According to both of the measurement results described above, it can be understood that the optimum average particle size of alumina as the filler raw material is within a range of 1 to 4 µm.

Next, a description will now be given of the amount of water in the filler raw slurry. In the measurement, various types of the slurry containing a different amount of water were prepared. The thermal treatment for each filler raw slurry was carried out at 900° C. for ten hours in order to harden the slurry. The shrinkage factor of the slurry was measured. Ten samples were prepared per filler raw slurry with a different amount of water.

Figure 9:
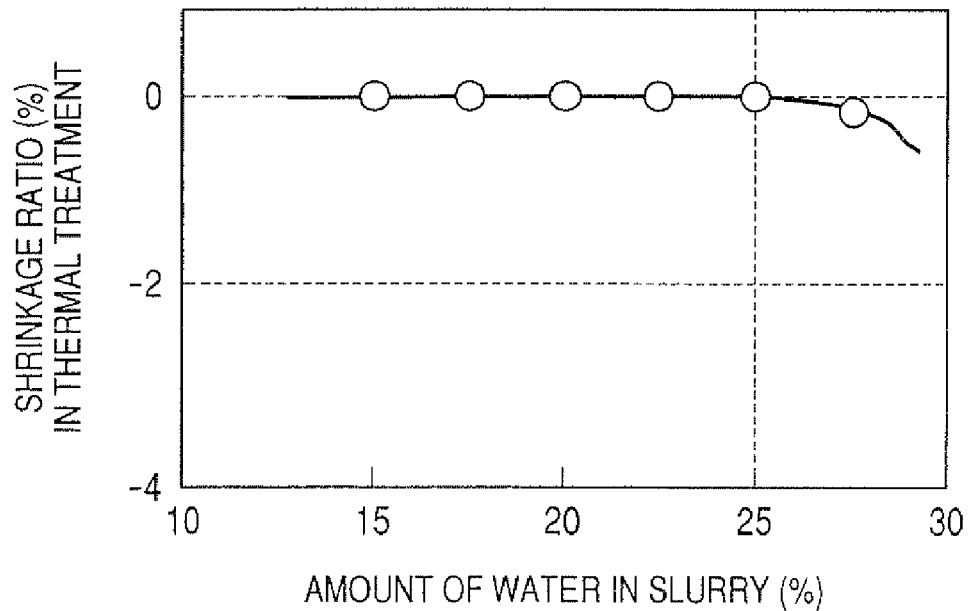
FIG. 9 is a diagram showing the relationship between the amount of water contained in slurry as a raw material and shrinkage of the filler according to the second embodiment of the present invention.

FIG. 9 is a diagram showing the relationship between the amount of water contained in the filler raw slurry and the shrinkage of the filler according to the second embodiment of the present invention.

As can be understood from the experimental results shown in FIG. 9, the filler is shrunk when the amount of water contained in the slurry exceeds 25 wt %. When the amount of water contained in the slurry is not more than 25 wt %, no shrinkage occurs in the filler.

Further, when the amount of water in the slurry is less than 15 wt %, it becomes impossible to make the slurry using the filler raw material, and also difficult to inject the filler raw material into the cover case.

As a result, it is preferable that the amount of water contained in the filler raw slurry is within a range of 15 to 25 wt %.

Third Embodiment

A description will be given of a temperature sensor and a method of producing the temperature sensor according to a third embodiment of the present invention with reference to FIG. 10 to FIG. 12.

In the third embodiment, the small diameter part 41 in the cover case 4 where the filler has been filled was vertically cut into a plurality of parts. A plurality of the parts were used as experimental samples in the third embodiment. In particular, the cover case for use in the experiment according to the third embodiment has no temperature sensitive element therein.

The outer diameter of the small diameter part 41 of the cover case 4 was 2.5 mm, and the inner diameter thereof was 1.88 mm. The filler 5 was obtained by the composition ratio shown in the second embodiment. That is, the average particle size of alumina was within a range of 1 to 4 μm, and the amount of water was within a range of 15 to 25 wt %.

Figure 10:
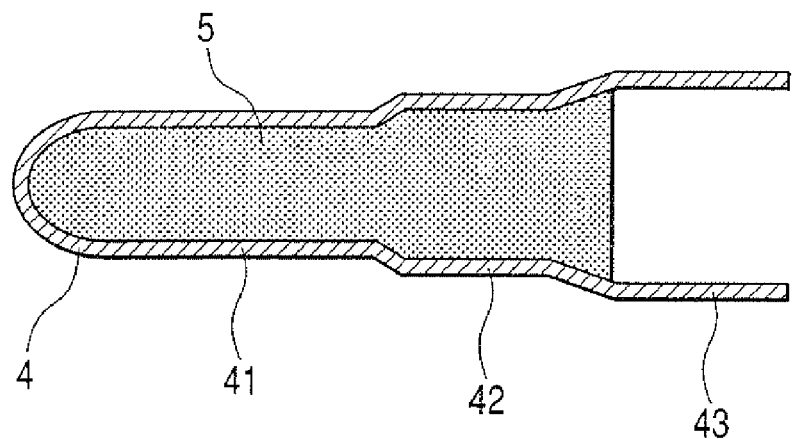
FIG. 10 is an explanatory diagram showing a sample of a filler filled in the cover case in a temperature sensor according to a third embodiment of the present invention.

FIG. 10 is an explanatory diagram showing the small diameter part 41 of the cover case 4 where the filler is filled for use in the experiment according to the third embodiment of the present invention.

Figure 11:
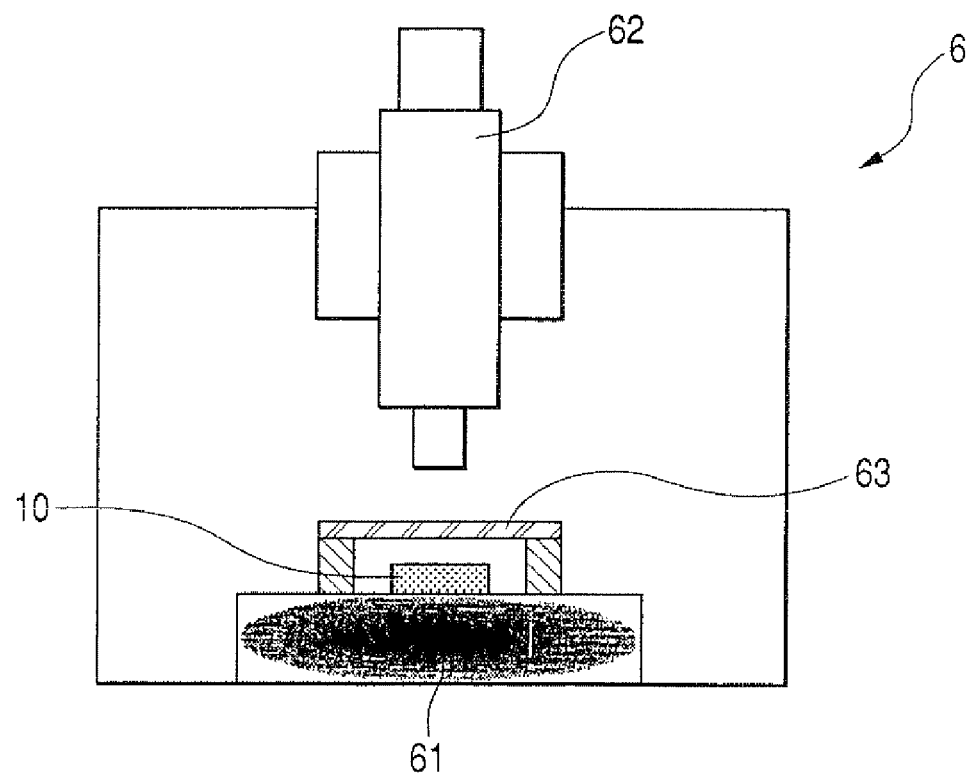
FIG. 11 is an explanatory diagram showing a high temperature microscope to be used in the third embodiment of the present invention.
Figure 12A:
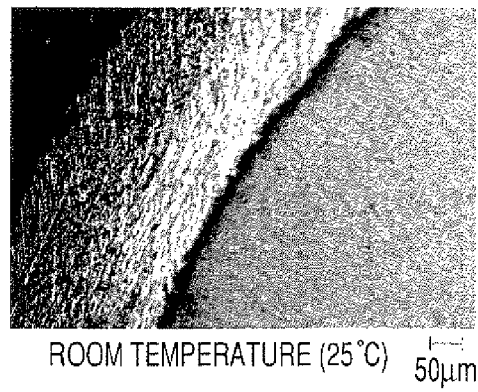
FIGS. 12A to 12D show photographs of the sample at each temperature.
Figure 12B:
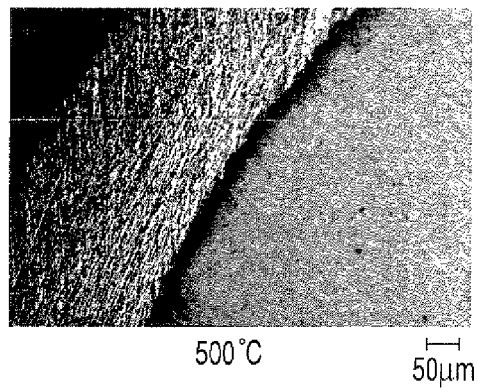
Figure 12C:
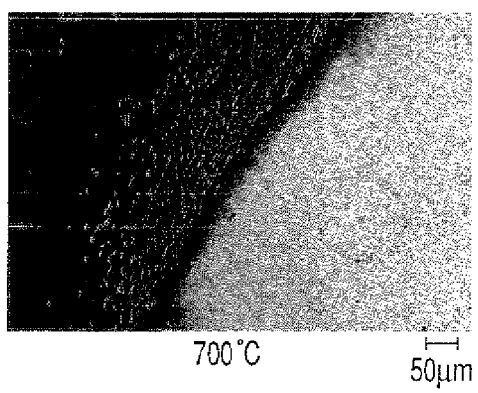
Figure 12D:
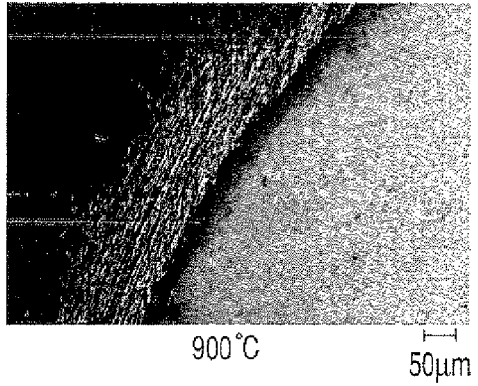

FIG. 11 is an explanatory diagram showing a high temperature microscope 6 to be used in the third embodiment of the present invention.

As shown in FIG. 11, the high temperature microscope 6 is comprised of a heating stage 61, a microscope 62, and a quartz glass 63, where a sample 10 is placed and then heated on the heating stage 61. The quartz glass 63 is placed between the microscope 62 and the sample 10. Using such a high temperature microscope 62, a cross section of the sample 10, in particular, the boundary area between the filler 5 and the cover case 4 was measured.

The boundary part between the filler 5 and the cover case 4 in each sample 10 was inspected at room temperature RT (25° C.), 500° C., 700° C., and 900° C. by the microscope 62.

FIGS. 12A to 12D show those photographs of the samples 10 at each temperature.

In the photographs, a relatively white part indicates the filler 5 and a belt shaped area at the middle part and the left upper part designates the cover case 4. A slant circular-shaped black line in the middle part of the photograph designates the boundary part between the cover case 4 and the filler 5. Such a boundary area appears in black because the boundary area is uneven or has an irregular surface.

As clearly shown in FIG. 12A to 12D, there is no gap between the filler 5 and the cover case 4 between the temperature range of 25° C. to 900° C.

Fourth Embodiment

A description will be given of a temperature sensor and a method of producing the temperature sensor according to a fourth embodiment of the present invention with reference to FIG. 13.

Figure 13:
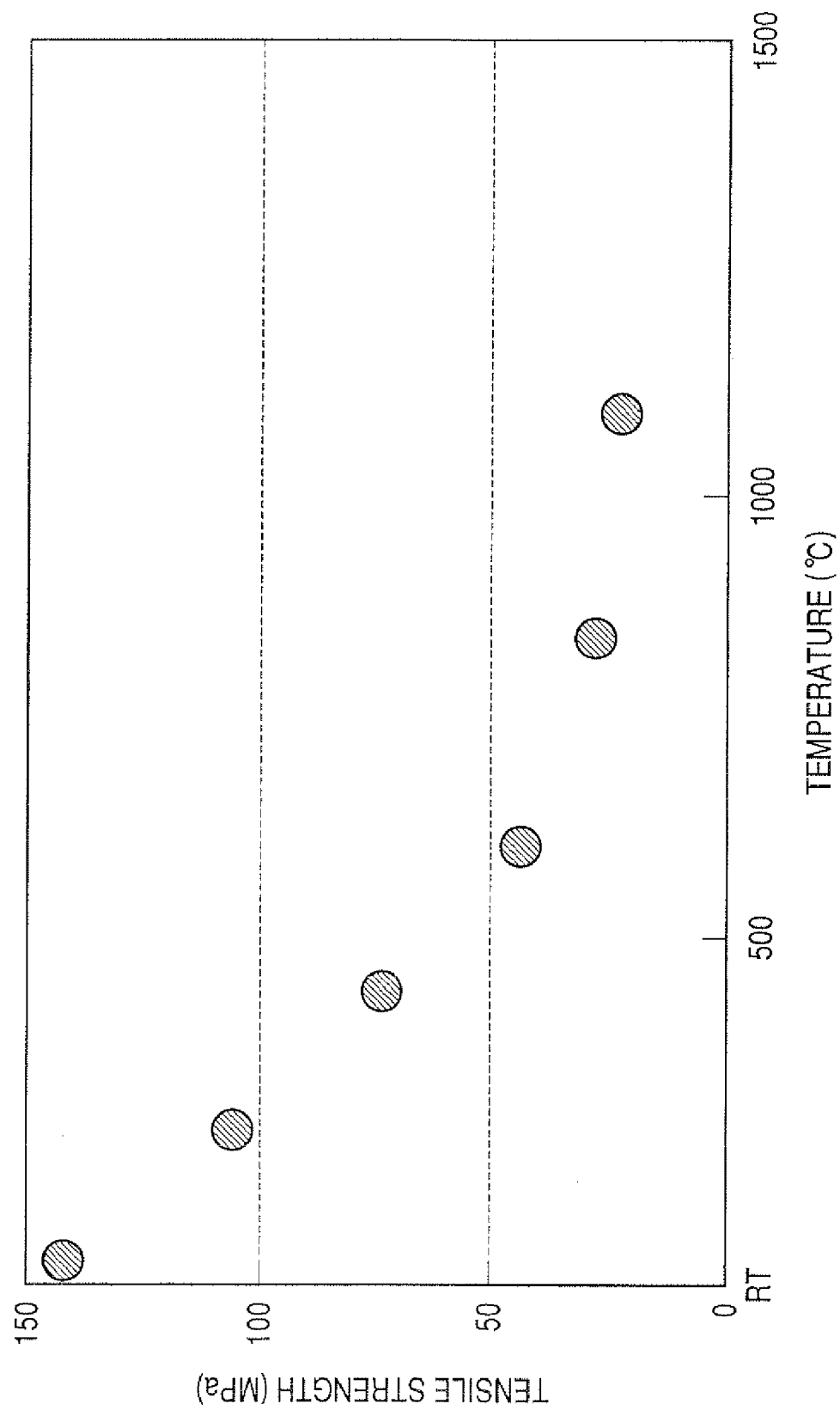
FIG. 13 is a diagram showing the relationship between tensile strength and temperature of platinum (Pt) electrodes of the temperature sensitive element in the temperature sensor according to a fourth embodiment of the present invention.

FIG. 13 is a diagram showing the relationship between the tensile strength and the temperature of platinum Pt forming the electrodes 21 of the temperature sensitive element 2 in a temperature sensor 1 according to the fourth embodiment of the present invention.

In the fourth embodiment, the tensile strength of each platinum (Pt) wiring was measured at different temperature. The electrodes 21 of the temperature sensitive element 2 in the temperature sensor 1 are made of platinum. That is, after completion of the thermal treatment of the platinum wires at 900° C. for ten hours, the tensile strength of each platinum wiring was measured at a different temperature using a material testing machine AG-100kN manufactured by SHI-MADZU Corporation. FIG. 13 shows the measurement result of the tensile strength of each platinum wiring at a different temperature after completion of the thermal treatment using AG-100kN.

As clearly understood from FIG. 13, the more the temperature increases, the more the tensile strength of the platinum wiring decreases. In particular, the tensile strength of the platinum wiring is less than 50 MPa, when the temperature is not less than 600° C.

Accordingly, under a high temperature environment of not less than 600° C., it can be considered to decrease the tensile strength of the electrodes 21 made of platinum. That is, there is a possibility of breaking the electrodes 21 made of platinum by the stress generated by vibration of the temperature sensitive element 2 under such a high temperature environment. In order to avoid problems occurring in the temperature sensor, the present invention provides the temperature sensor 1 and the method of producing the temperature sensor capable of preventing generation of a gap between the filler 5 and the cover case 4 even if under vibration and in a high temperature environment, for example, in the exhaust gas system for an internal combustion engine of a vehicle. This can effectively increase the durability of the electrodes 21 made of platinum in the temperature sensitive element 2 of the temperature sensor.

Fifth Embodiment

A description will be given of a temperature sensor and a method of producing the temperature sensor S according to a fifth embodiment of the present invention with reference to FIGS. 14A to 14C.

Figure 14A:
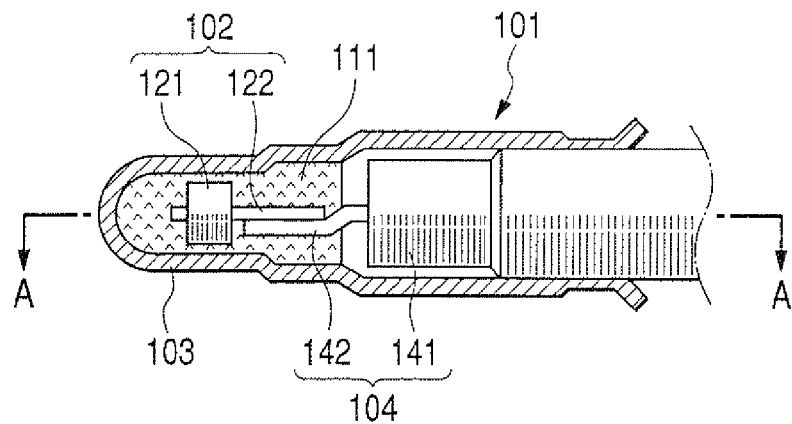
FIG. 14A is an enlarged diagram of a configuration of a temperature sensitive element in a temperature sensor according to a fifth embodiment of the present invention.

FIG. 14A is an enlarged diagram of a configuration of the temperature sensitive element in the temperature sensor S according to the fifth embodiment of the present invention. FIG. 14B is a cross section on the A-A line in the temperature sensor S shown in FIG. 14A. FIG. 14C is an entire diagram showing the configuration of the temperature sensor S according to the fifth embodiment.

The temperature sensor S of the fifth embodiment is used in detecting the temperature, in an exhaust gas purifying system of a vehicle, for example. In particular, the temperature sensor S of the fifth embodiment is mounted in an exhaust gas system for an internal combustion engine of a vehicle, and works in a temperature of not less than 750° C. of the exhaust gas. The detected temperature values are used in various controls.

Figure 14B:
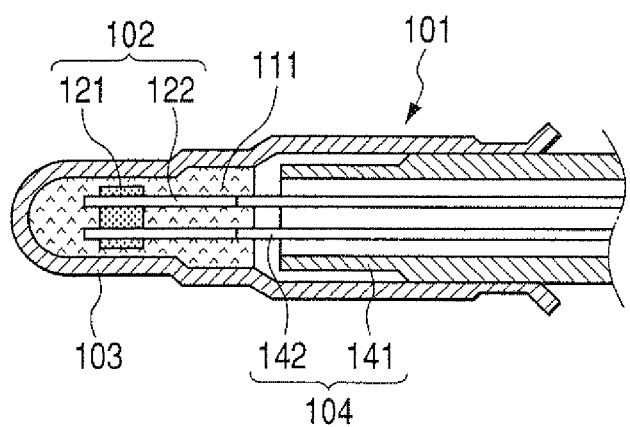
FIG. 14B is a cross section of A-A line in the temperature sensor shown in FIG. 14A.
Figure 14C:
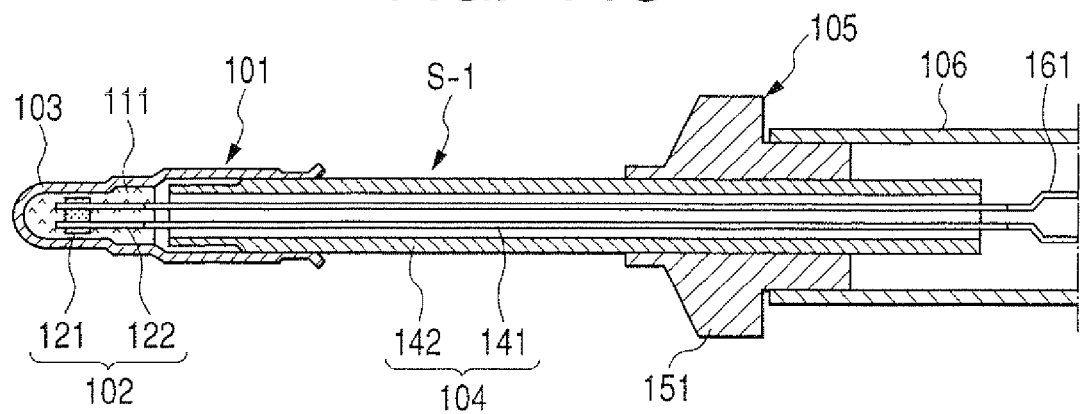
FIG. 14C is a entire diagram showing the configuration of the temperature sensor according to the fifth embodiment of the present invention.

In FIG. 14C, the temperature sensor S is comprised of a sheath pin 104, a temperature sensitive element 101 equipped with a thermistor 102 therein for detecting the temperature, a cylindrical attachment part 105 having a flange 151, and a cover member 106. The temperature sensitive element 101 is placed at one end (the left side in FIG. 14C) of the temperature sensor S. The cylindrical attachment part 105 and the cover member 106 are placed at the outer periphery of the other end (the right side in FIG. 14C) of the temperature sensor S.

When the temperature sensor S is used as an exhaust gas temperature sensor mounted on an exhaust gas pipe, for example, the temperature sensitive element 101 and the sheath pin 104 are inserted into an installation hole of the exhaust gas pipe, the flange 151 of the attachment part 105 is fitted into the installation hole of the exhaust gas pipe and fixed by a nut (not shown). The temperature sensitive element 101 as a front part of the temperature sensor S projects into the inside of the exhaust gas pipe and is exposed to the exhaust gas flowing in the exhaust gas pipe.

The sheath pin 104 is composed of a pair of insulated metal wires 142 in a cylindrical metal sheath 141, open at both ends. The base end part of the sheath pin 104 is disposed in the cover member 106 and also within the cylindrical attachment part 105. The sheath pin 104 is also electrically connected to a pair of lead wires 161 in which metal core wires projecting from a metal sheath 141 are insulated. The lead wires 161 are connected to a controller such as an ECU (not shown). The temperature of the exhaust gas flowing in the exhaust gas pipe is detected based on a change of a resistance value of the thermistor element 102.

As shown in FIG. 14A and FIG. 14B, the temperature sensitive element 101 of the temperature sensor S is accommodated in a metal cover case 103 with a cap shape so that the thermistor element 102 is electrically connected to the sheath pin 104. The thermistor 102 is comprised of a thermistor main body part 121 (hereinafter, referred to as the "thermistor body 121") and a pair of lead wires projecting from the thermistor body 121 to the sheath pin 104 side. In the thermistor 102, the insulated metal wires 142 projecting from metal sheath part 141 are connected to the lead wires 122 in the metal cover case 103.

The metal cover case 103 is a difference-level cylindrical body. A front part of the cylindrical metal cover case 103 is closed in a hemispherical shape, and the other part thereof has plural sections having different diameters. The thermistor body 121 of the thermistor 102 is accommodated in the front section having the smallest diameter of the metal cover case 103 and is closed to the inner peripheral surface of the metal cover case 103. The middle section of the metal cover case 103 has a larger diameter when compared with the diameter of the front section of the metal cover case 103.

In general, in order to provide the temperature sensor, with high responsiveness, it is preferable to decrease the size of the temperature sensitive element 101. For example, it is recommended that the outer diameter of the metal cover case 103 at a filler part 111, (with anti-vibration function) is not more than 3.0 mm, more preferably, not more than 2.5 mm, and the depth in the axial direction of the filler part 111 (having an anti-vibration function) is not more than 15.0 mm, more preferably, not more than 10.0 mm.

This configuration can decrease the volume of the filler part 111 having an anti-vibration function to be filled in the temperature sensitive element 101 and can increase its response characteristics while keeping the anti-vibration function.

The thermistor body 121 of the thermistor element 102 is composed of a thermistor made of well-known oxide semiconductor or a compound containing such an oxide semiconductor. For example, the thermistor is made of Cr—Mn metal oxide semiconductor and the like. The thermistor body 121 is produced by sintering a mold body of an oxide metal such as an oxide semiconductor equipped with a pair of the built-in lead wires 22 made of a metal material containing platinum (Pt) when the oxide metal is formed in a circular plate. Because the oxide semiconductors are easily affected by the amount of oxygen (i.e. the partial pressure of oxygen) in the atmosphere gas, the present invention provides a special structure of the anti-vibration filler 111 in the metal cover case 103 in order to obtain stable characteristics of the oxide semiconductor component.

The sheath pin 104 is requested to transmit a detection signal of the thermistor element 102 to an outside control device (not shown) with minimum electrical noise. In general, the cylindrical metal sheath 141 and the insulated metal wires 142 are composed of stainless steel, for example, thermal resistance metal such as SUS310S. The inside of the cylindrical metal sheath 141 is filled with a porous insulation material capable of allowing gas flow therein, for example, magnesium oxide (MgO) or alumina ($Al_2O_3$), in order to insulate the insulated metal wires 142 from each other, and to insulate the insulated metal wires 142 from the cylindrical metal sheath 141. In this configuration, outside air can be provided into the temperature sensitive element 101, mounted on an exhaust gas pipe for an internal combustion engine, through a gas passage formed in the sheath pin 104 in the temperature sensor S.

Because of being directly exposed to the exhaust gas flowing in the exhaust gas pipe in the exhaust gas system for the internal combustion engine of the vehicle, the metal cover case 103 is required to have a corrosion resistance, a high strength, and a thermal resistance at a high temperature. It is therefore recommended to make the metal cover case 103 using stainless steel, for example, SUS310S. The open end part of the metal cover case 103 is tightly jointed to the outer periphery of the cylindrical metal sheath 141 by laser welding. The space in the metal cover case 103 is filled with the anti-vibration filler 111 to maintain the anti-vibration function of the thermistor element 102 so that the anti-vibration filler 111 surrounds the thermistor element 102.

The anti-vibration filler 111 in the temperature element S is one of the important features of the fifth embodiment of the present invention. Such a feature of the fifth embodiment will now be explained in detail.

The anti-vibration filler 111 is made of a porous anti-vibration insulation material. In particular, the anti-vibration filler 111 has a pore ratio within a range of 30 to 70%, the anti-vibration function, and gives high responsiveness when the metal cover case 103 is filled with the anti-vibration filler 111. Specifically, as shown in FIG. 14A and FIG. 14B, the anti-vibration filler 111 is filled into the front end part and middle part of the metal cover case 103 so that it accommodates the thermistor body 121 of the thermistor element 102, the periphery of the lead wires 122, and the periphery of the connection part between the lead wires 22 and the insulated metal wires 142. The pore ratio can be calculated from a ratio [(1−bulk gravity)/true specific gravity] between the bulk specific gravity (as a measured value) and the true specific gravity of the anti-vibration filler 111.

The temperature sensor S according to the fifth embodiment to be mounted on an exhaust gas pipe for an internal combustion engine is requested to be durable under a temperature range of 900 to 1000° C. In particular, because oxidization of the metal cover case 103 is initiated under atmospheric temperatures of not less than 750° C., the oxidization of the oxide semiconductor which forms the thermistor element 102 must be considered. It is difficult to prevent oxidization of available metal materials of a thermal resistance function at a temperature of not less than 750° C.

On the contrary, the present invention provides the temperature sensor S having a pore ratio (or porosity) of not less than 30% for the anti-vibration filler 111 in the temperature sensitive element 101 in order to supply air from the sheath pin 104 to the area near the thermistor body 121 through the anti-vibration filler 111. This configuration supplies the air to the oxide semiconductor forming the thermistor element 102 and prevents decreasing of the partial pressure of oxygen in the surrounding atmosphere, and provides a stable oxide semiconductor characteristic, and rapidly conducts the thermal energy received by the metal cover case 103 to the thermistor body 121. When the pore ratio does not reach 30%, namely, is less than 30%, the chemical composition of the oxide semiconductor forming the thermistor element 102 becomes unstable, and the resistance value thereof varies. In addition, the thermal conductivity function to be conducted from the metal cover case 103 to the thermistor body 121 is suppressed and the responsiveness of the temperature sensor S is thereby decreased.

When the pore ratio of the anti-vibration filler 111 is not more than 70%, it is possible to suppress the displacement at the connection part of the thermistor element 102 and the sheath pin 104 by the presence of the anti-vibration filler 111 and to avoid a breaking of the wires 122 and 142.

On the other hand, when the pore ratio of the anti-vibration filler 111 exceeds 70%, the anti-vibration filler 111 decreases the function of supporting the thermistor element 2 and the surrounding area, and further decreases its anti-vibration function. Therefore it is preferable that the anti-vibration filler 111 has its pore ratio within a range of 40 to 60%, more preferably, within a range of 44 to 55% in order to provide both of the anti-vibration function and high responsiveness.

It is preferable that the insulating porous material forming the anti-vibration filler 111 is made mainly of inorganic ceramic powder in views of the thermal stability, more preferably, made mainly of alumina having superior thermal stability and thermal conductivity. It is possible to use inorganic powder such as silica ($SiO_2$) powder and magnesium oxide (MgO) powder instead of such alumina.

A well-known inorganic binder and a solvent are added into such a powder, and a separator is further optionally added in order to make a uniformly-mixed slurry. The slurry obtained is filled into the area between the metal cover case 103 and the thermistor element 102. The metal cover 102 with the slurry is fired in order to produce the anti-vibration filler 111. Water is used as such a solvent. It is possible to use ethyl alcohol as the solvent instead of water. It is also possible to add an optional amount of lubricant or surface active agent in order to uniformly fill the slurry into the metal cover case 103. At this time, because a plurality of pores is formed in the slurry by evaporating water in the slurry during the thermal treatment, it is possible to form the anti-vibration filler 111 of a desired pore ratio by adjusting the amount of water and the temperature in the thermal treatment. Usually, it is preferable to use the amount of water within a range of 10 to 40 wt % and to control the temperature within a range of 900 to 1000° C.

Figure 15A:
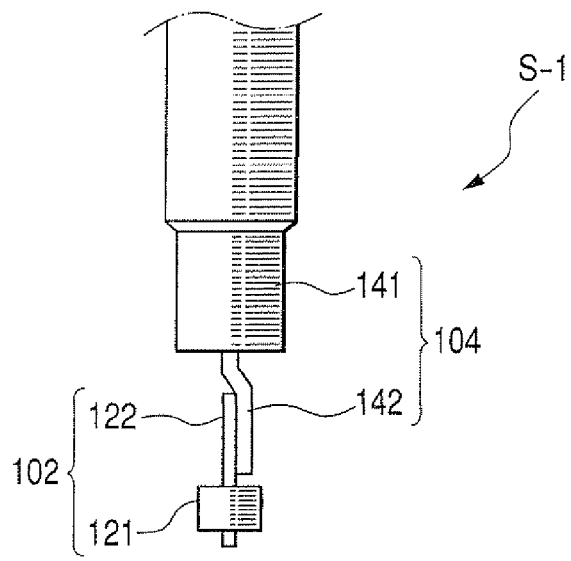
FIG. 15A is an explanatory diagram showing a method of producing the temperature sensor according to the fifth embodiment of the present invention.
Figure 15B:
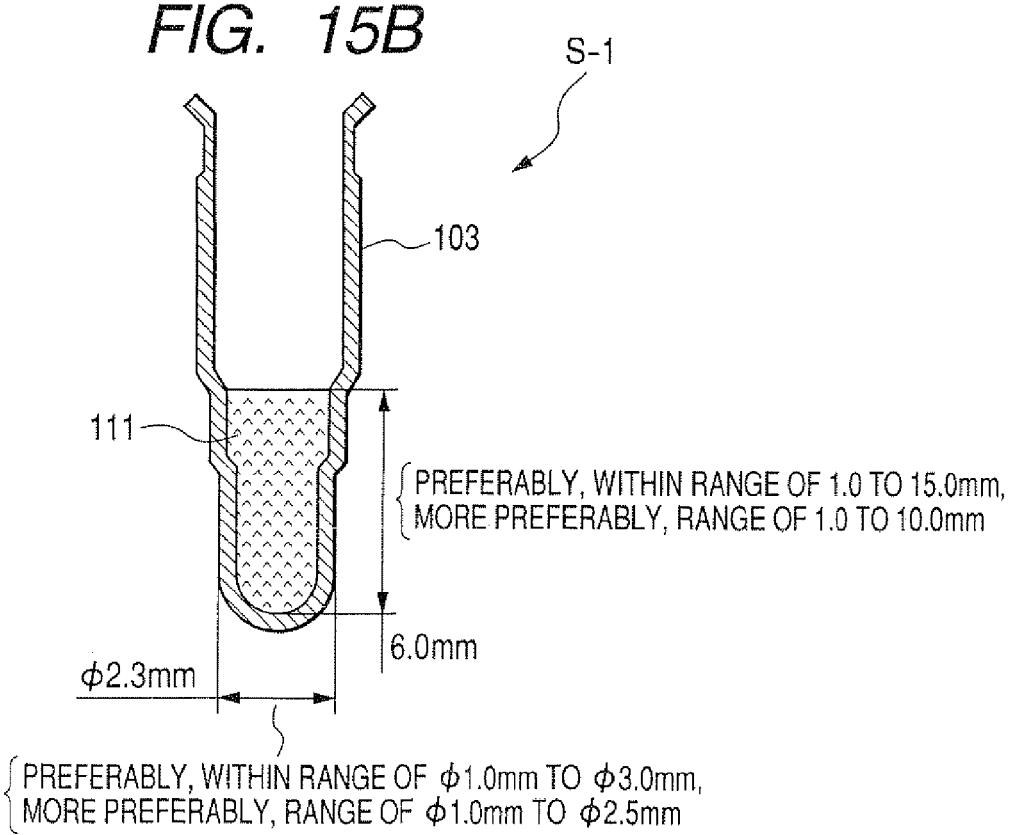
FIG. 15B is an explanatory diagram showing the method of producing the temperature sensor according to the fifth embodiment of the present invention.

FIG. 15A is an explanatory diagram showing the method of producing the temperature sensor according to the fifth embodiment of the present invention. FIG. 15B is an explanatory diagram showing the method of producing the temperature sensor according to the fifth embodiment of the present invention. As shown in FIG. 15A, on producing the temperature sensor S, the lead wires 122 of the thermistor element 102 and the metal core wires 142 of the sheath pin 104 are connected together by laser welding in advance. On the other hand, the slurry for the anti-vibration filer 111 is formed by the above manner. As shown in FIG. 15B, a desired amount of the slurry is filled into the metal cover case 103 using a dispenser. For example, the outer diameter of the front end part of the metal cover case 103 is φ2.3 mm, and the filling depth of the anti-vibration filler 111 is 6.0 mm, as shown in FIG. 15B. It is preferable that the outer diameter of the front end part of the metal cover case 103 is within a range of φ1.0 mm to φ3.0 mm, more preferably, within a range of φ1.0 mm to φ2.5 mm. It is preferable that the filling depth of the anti-vibration filler 111 is within a range of 1.0 mm to 15.0 mm, more preferably within a range of 1.0 mm to 10.0 mm.

In this condition, the thermistor element 102 and the sheath pin 104 are slowly inserted into the metal cover case 103 containing the slurry. Following, the water contained in the slurry is evaporated at 100° C. After completion of the evaporation, the metal cover 103 and the cylindrical metal sheath 141 are fixed together by laser welding. In order to make the anti-vibration filler 111 having a desired bulk specific gravity and a desired anti-vibration function, the thermal treatment is performed at the above temperature range previously discussed for the above length of time. The temperature sensitive element 101 in the temperature sensor S is thereby produced.

Sixth Embodiment

A description will be given of a temperature sensor and a method of producing the temperature sensor according to a sixth embodiment of the present invention with reference to FIGS. 16A and 16B.

Figure 16A:
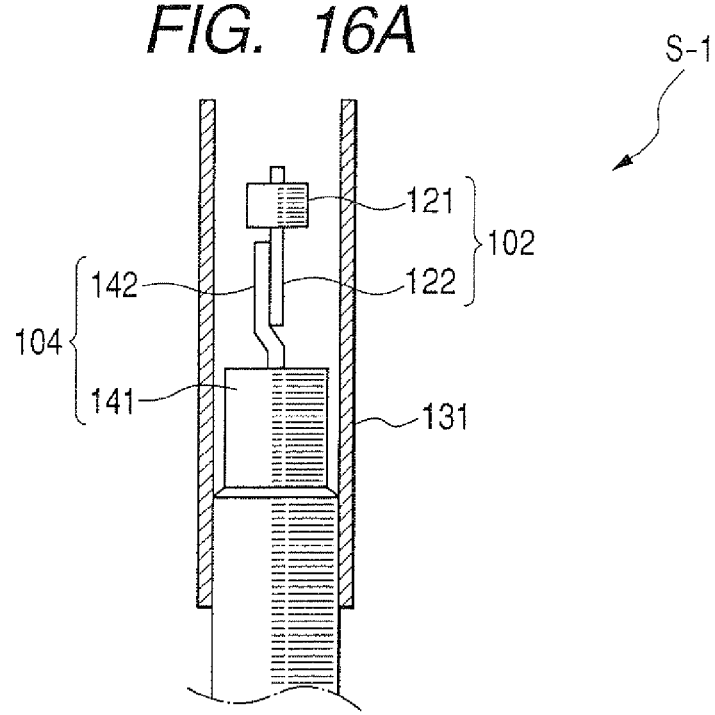
FIG. 16A is an explanatory diagram showing a method of producing the temperature sensor having a metal cover case composed of a cylindrical guide part according to a sixth embodiment of the present invention.
Figure 16B:
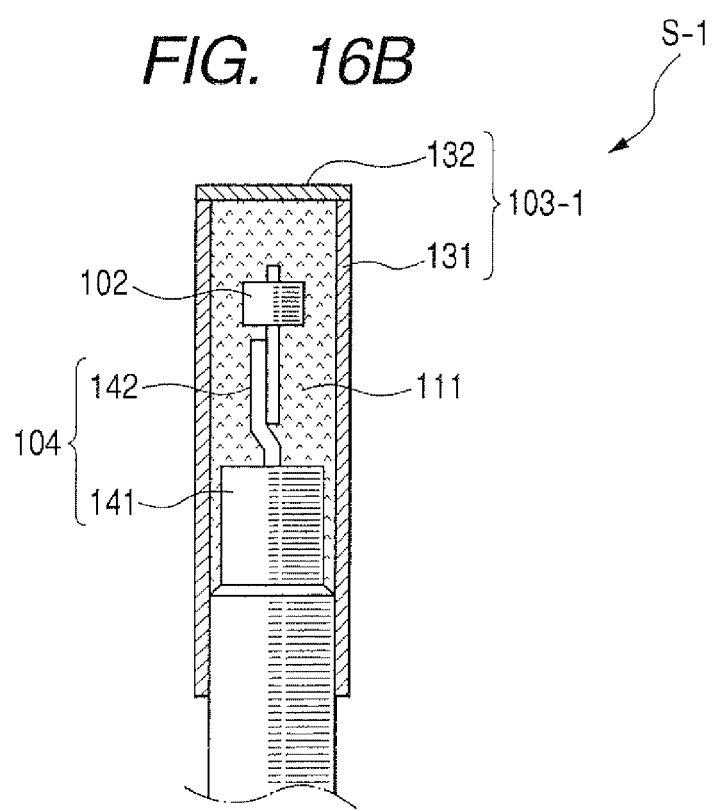
FIG. 16B is an explanatory diagram showing the method of producing the temperature sensor having the metal cover case composed of the cylindrical guide part and a cap according to the sixth embodiment of the present invention.

FIG. 16A and FIG. 16B are explanatory diagrams showing a method of producing the temperature sensor S-1 according to a sixth embodiment of the present invention. As shown in FIG. 16A and FIG. 16B, the temperature sensor S-1 has a metal cover case 103-1 composed of a cylindrical guide part 131 and a cap 132. On producing the temperature sensor S-1 shown in FIG. 16A, the cylindrical guide member 131 is inserted toward the thermistor element 102 in order to cover the thermistor element 102 connected to the sheath pin 104 in advance by laser welding, and to fix the cylindrical guide part 131 to the sheath pin 104.

Next, the slurry prepared in the above manner is inserted and filled in the cylindrical guide part 131 through its upper opening end part. The slurry which becomes the anti-vibration filler 111 is dried at 100° C. After completion of this drying step, as shown in FIG. 16B, the cap 132 is tightly connected to the upper opening end part of the cylindrical guide part 131. Following, the thermal treatment for the sensitivity temperature element 101 in the temperature sensor S-1 is carried out at the temperature within the desired range for the desired period of time. The production of the temperature sensitive element 101 in the temperature sensor S-1 is thereby completed.

Next, a description will now be given of the comparison results in a pore ratio (porosity) and an air flow amount between the temperature sensor of the sixth embodiment and a temperature sensor used as a comparison example.

Figure 17A:
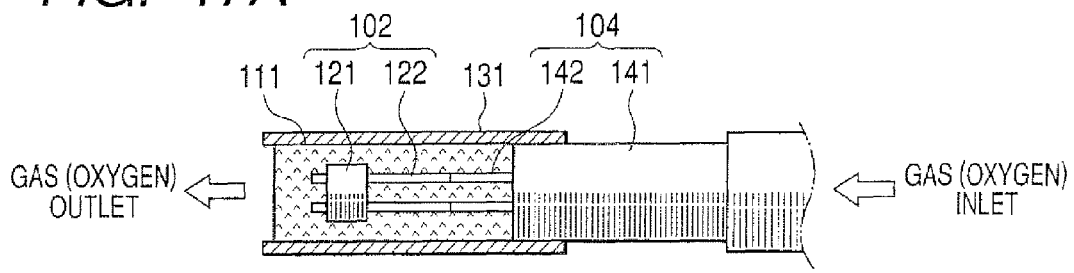
FIG. 17A is a cross section of a temperature sensitive element in a temperature sensor as a comparison example.

FIG. 17A is a cross section of the temperature sensitive element in the temperature sensor as the comparison example. On preparation of the temperature sensor of the sixth embodiment according to the present invention, the thermistor element 102 was connected to the sheath pin 104 by laser welding, like the same manner shown in FIG. 16B, and the cylindrical guide part 131, which becomes the metal cover case 103, was fixed to the outer periphery of the sheath pin 104. Following, the anti-vibration filler 111 was filled to the inside of the cylindrical guide part 131. In particular, the anti-vibration filler 111 was prepared as follows. Alumina (average particle size of 2.5 mm) was used as a base component of the slurry. Inorganic binder such as kaolin and talc was added as a sintering agent to make 9 wt % of the total, the other 91 wt % being the Alumina. Further, 25 g of water and 1 g of separator were added to 100 g of the inorganic ceramic powder, and they were mixed in order to make slurry. The slurry was completely filled into the cylindrical guide part 131 without any gap. The thermal treatment for the metal cover case 103-1 composed of the cylindrical guide part 131 and the cap 132 was carried out at 900° C. for 10 hours.

In the sixth embodiment, the temperature sensor has no cap 132 shown in FIG. 16B on the metal cover case 103 of the sensitivity temperature element 101. That is, air is supplied from the base end of the sheath pin 104 by gas permeability (from an inlet part at the right side in FIG. 17A) to the cylindrical guide part 131 in which the thermistor element 102 is built in.

The air flow amount was measured at the opening outlet part (as the output side on the left in FIG. 17A) of the thermistor element 102. This air flow amount is equal to the air flowing through the anti-vibration filler 111. The measured air flow amount was $10^{-3}$ ml/sec/MPa. At this time, the gas permeability amount (or a gas flow amount) was measured based on the volume per time. The volume from the anti-vibration filler 111 was collected using a well-known method of a gas collecting flask in a liquid.

The pore ratio of the anti-vibration filler 111 in the temperature sensor S-1 of the sixth embodiment was 50%. The pore ratio was measured using the following equation.

Pore ratio (or porosity) (%)=[(1−bulk specific gravity/true specific gravity)×100].

Figure 17B:
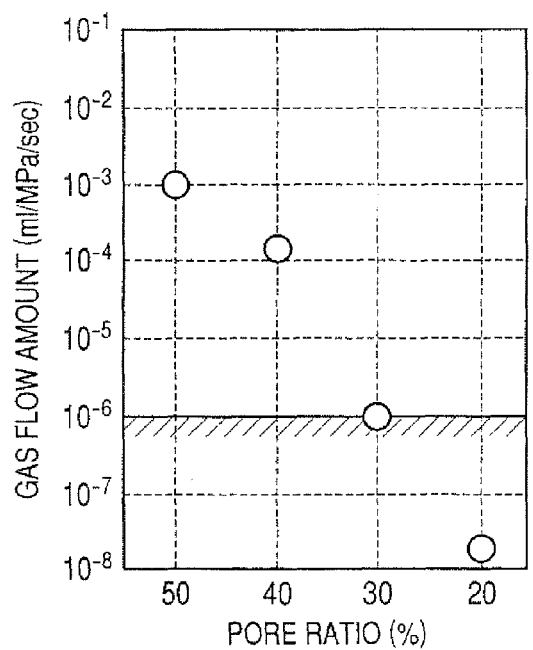
FIG. 17B is a diagram showing the relationship between porosity (or pore ratio) and gas flow amount in the temperature sensor according to the present invention.

The gas permeability amount of the anti-vibration filler of various pore ratios was measured. The various anti-vibration fillers were produced by changing the water amount as the solvent to be added to the slurry and the temperature in the thermal treatment. The measurement results are shown in FIG. 17B. That is, FIG. 17B shows the relationship between the pore ratio and the permeability amount (or the gas flow amount) in the anti-vibration filler. In FIG. 17B, the horizontal line indicates the pore ratio (%), and the vertical line indicates the permeability amount.

As clearly shown in FIG. 17B, there is an apparent correlation between the pore ratio and the permeability amount of the anti-vibration filler. That is, the more the pore ratio increases, the more the permeability increases.

The effect of the gas permeability amount on the characteristic of the thermistor element 102 was measured. That is, the change of the resistance value of the thermistor element 102 was measured according to the change of the pore ratio of the anti-vibration filler 111 within a range of 20 to 55%.

The anti-vibration filler 111 having a desired pore ratio, which was adjusted by changing the water amount and the thermal treatment temperature, was filled into the cylindrical guide part 131 and the cap 132 was covered and fixed to the cylindrical guide part 131 in order to obtain the sensitivity temperature element 101. In order to adequately oxidize the metal cover 103, the sensitivity temperature element 101 was exposed at 1000° C. for 2 hours. The resistance value of the sensitivity temperature element 101 was measured before the thermal treatment and the resistance value of the sensitivity temperature element 101 was also measured at 600° C. after the thermal treatment.

Figure 17C:
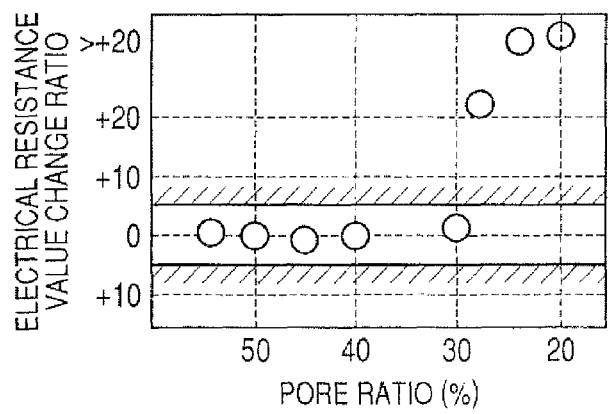
FIG. 17C is a diagram showing the relationship between porosity (or pore ratio) and electrical resistance change rate in the temperature sensors.

FIG. 17C shows a relationship between the pore ratio (or the porosity) and the resistance value of the anti-vibration filler at 600° C. after completion of the thermal treatment. In FIG. 17C, the horizontal line indicates the pore ratio (%), and the vertical line indicates the resistance value change ratio.

As clearly shown in FIG. 17C, when the pore ratio of the anti-vibration filler 111 is a small value such as 20%, the resistance change ratio of the thermistor element 102 is a large value such as 20% or more. According to the increase of the pore ratio of the anti-vibration filler 111, the resistance value change ratio of the thermistor element 102 is rapidly decreased. When the pore ratio is not less than 30%, the resistance value change ratio of the thermistor element 102 is not more than 5%.

When the pore ratio is not less than 40%, the resistance value change ratio of the thermistor element 102 is not more than 2%. When the pore ratio is not less than 45%, the resistance value change ratio of the thermistor element 102 approximately converges to zero (0%).

Therefore as shown in FIG. 17B and FIG. 17C, when the allowable range of the resistance value change ratio of the thermistor element 102 is ±5%, it is necessary to have a pore ratio of not less than 30%, that is, the permeability (or gas flow amount) of not less than $10^{-6}$ ml/sec/MPa.

Keeping the gas permeability (or gas flow amount) of not less than $10^{-6}$ ml/sec/MPa can avoid a resistance value change of the thermistor element 102.

A description will now be given of the mechanism regarding the conductivity and the resistance value change of the thermistor element 102.

FIG. 18A is a diagram showing a model of an oxide semiconductor forming the thermistor element 102 in the temperature sensor. FIG. 18B is a schematic cross section showing the relationship between gas flow in the temperature sensitive element and an oxidation of the metal cover case in the temperature sensor.

In general, the oxide semiconductor forming the thermistor element 102 is a P type semiconductor device of $ABO_3$ type crystal structure, shown in FIG. 18A, where holes "h" are conductivity carriers.

The metal cover case 103 in the temperature sensitive element 101 oxidizes at a temperature of not less than 750° C., as shown in FIG. 18B, and captures oxygen from the atmosphere. At this time, when an adequate amount of oxygen to be introduced from the sheath pin 104, to the inside of the metal cover case 103 is not supplied to the thermistor body 121, the number of holes "h" in the oxide semiconductor is reduced by capturing oxygen. As a result, the resistance of the thermistor element 102 is decreased. If oxygen is supplied to the oxide semiconductor, the holes "h" are generated using the oxygen and the resistance value of the thermistor element 102 is thereby increased, as shown in FIG. 18C. FIG. 18C is a diagram showing a relationship between a partial pressure of oxygen and a resistance of the oxide semiconductor which forms the thermistor element 102.

That is, the change of the partial pressure of oxygen causes the change of the resistance value of the thermistor element 102, and the characteristic of the temperature sensor is thereby changed, namely, becomes unstable.

On the contrary, according to the temperature sensor of the present invention, when the anti-vibration filler 111 has the pore ratio of not less than 30% (namely, permeability not less than $10^{-6}$ ml/sec/MPa), it is possible to supply the adequate amount of oxygen to the thermistor body 121 of the temperature sensor through the pores in the anti-vibration filler 111 in order to perform the oxidation of the metal cover case 103.

This can extremely enhance the stability of the electrical resistance-value output characteristics of the temperature sensitive element in the temperature sensor while suppressing the decrease of the partial pressure of oxygen around the thermistor element 102.

Figure 19:
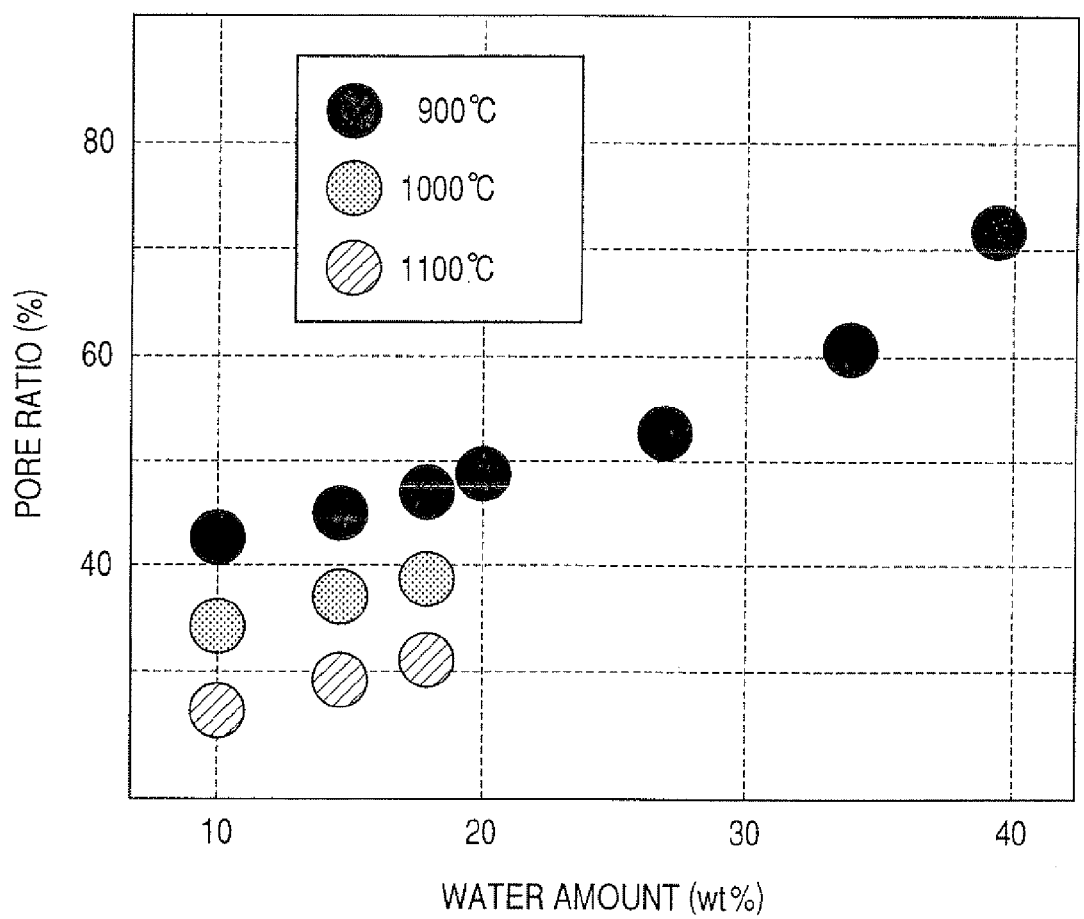
FIG. 19 is a diagram showing the relationship between the amount of water added to a slurry, which becomes the anti-vibration filler, and the porosity (or pore ratio) of the anti-vibration filler in the temperature sensor.

FIG. 19 is a diagram showing the relationship between the amount of water added into the slurry which becomes the anti-vibration filler 111 and the porosity (or the pore ratio) of the anti-vibration filler 111 in the temperature sensor according to the present invention. As shown in FIG. 19, the more water is added to the slurry, the more the pore ratio increases. The lower the temperature of the thermal treatment is, the more the pore ratio of the anti-vibration filler 111 increases. That is, FIG. 19 clearly shows that the pore ratio of the anti-vibration filler 111 in the temperature sensor can be controlled based on the amount of water to be added to the slurry and the temperature of the thermal treatment.

Thus, it is possible to form the anti-vibration filler 111 having a desired pore ratio based on the experimental results which have been evaluated in advance, regarding the pore ratio corresponding to the amount of water to be added into the inorganic ceramic powder as the main component of the anti-vibration filler 111 and the temperature of the thermal treatment.

Figure 20A:
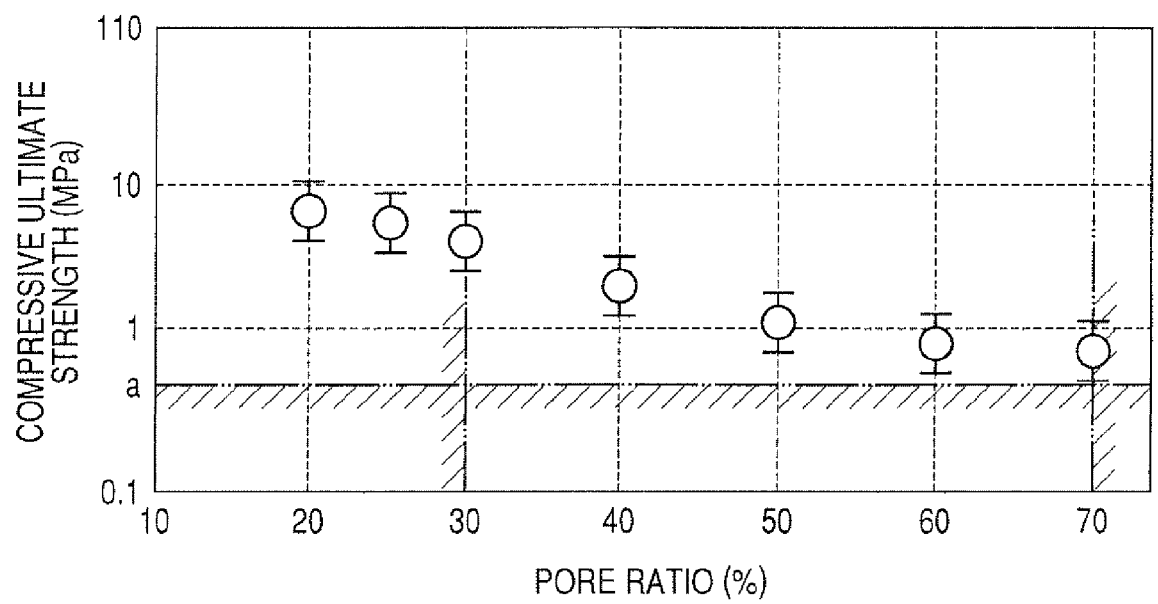
FIG. 20A is a diagram showing the relationship between the pore ratio and ultimate compressive strength in the temperature sensor.
Figure 20B:
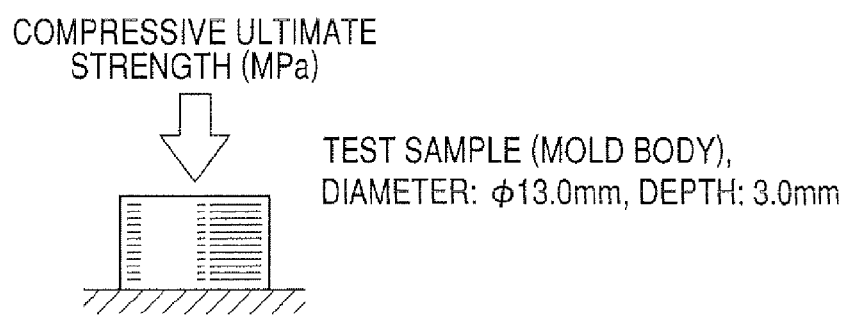
FIG. 20B is an explanatory diagram showing a compressive test.

FIG. 20A shows the affect of the pore ratio to the anti-vibration function. That is, FIG. 20A shows the relationship between the pore ratio (or the porosity) and the compressive ultimate strength in the temperature sensor. FIG. 20B is an explanatory diagram showing a compressive test using a mold body as a test sample.

A test sample (its diameter is 13.0 mm and its thickness is 3.0 mm) of a circular plate shown in FIG. 20B was prepared using the anti-vibration filler 111. The test samples made of various types of the anti-vibration fillers whose pore ratio is within a range of 20 to 70% were prepared and tested in compressive ultimate strength by applying a load onto the upper surface of each test sample.

As apparently from the experimental results shown in FIG. 20A, the more the pore ratio increases, the lower the compressive ultimate strength. However, the test sample having the pore ratio within a range of 60 to 70% has approximately 1 MPa which is adequately larger than the strength "a" shown in FIG. 20A. The lateral line in FIG. 20A indicates the strength "a (MPa)" which can tolerate the vibration acceleration of not less than 50 G in a vehicle.

On the contrary, when the pore ratio is not more than 55%, the compressive ultimate strength exceeds 1 MPa. The more the pore ratio increases, the more the compressive ultimate strength increases. However, when the pore ratio is lower than 30%, the characteristic of the thermistor element is deteriorated because the gas permeability of the anti-vibration filler is decreased.

Accordingly, as described above in detail, it is preferable to have the anti-vibration filler 111 of the pore ratio within a range of 30 to 70%, more preferably, within a range of 44 to 55%. This condition can keep the adequate amount of gas permeability, suppress the decrease of the partial pressure of oxygen, provides a stable characteristic of the thermistor element, absorbs the vibration and shock, and avoids breaking of the lead wires and damage to the thermistor element caused by shifting the position of the thermistor element in the temperature sensor.

The present invention can realize and provide a temperature sensor with stable output characteristics with high reliability, high resistance to vibration, and high responsiveness even if it is placed in a high temperature and vibration environment, for example, when it is mounted on an exhaust gas system for an internal combustion engine of a vehicle.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A temperature sensor comprising:
   a temperature sensitive element, whose electrical characteristic changes based on a temperature;
   a sheath pin accommodating the temperature sensitive element so that a pair of electrodes of the temperature sensitive element electrically connected to a pair of signal wires of the sheath pin is exposed at a front part of the sheath pin;
   a cover case placed at a front part of the temperature sensor accommodating the temperature sensitive element; and
   a filler, made of a material whose hardening temperature is not less than 600° C., filled between the temperature sensitive element and the cover case in order to fix the temperature sensitive element to the cover case,
   wherein the filler is made of thermal resistance ceramic material composed mainly of a main component, and an agent, wherein the main component is one of alumina ($Al_2O_3$), silicon dioxide ($SiO_2$), magnesium oxide (MgO), and zirconium dioxide ($ZrO_2$), and the agent is a combination of $CaCO_3$, kaolin, talc, and boric acid.

2. The temperature sensor according to claim 1, wherein a pair of the electrodes of the temperature sensitive element is made of one of platinum and a platinum based material.

3. The temperature sensor according to claim 1, wherein the temperature sensitive element is composed of a thermistor element, and the filler is made mainly of alumina.

4. The temperature sensor according to claim 1, wherein the agent is a combination of $CaCO_3$, kaolin, talc and boric acid and has the composition ratio (wt %):

TABLE 2

| | |
|---|---|
| $CaCO_3$ | 3.6 ± 0.06 wt % |
| Kaolin | 3.0 ± 0.06 wt % |
| Talc | 1.7 ± .04 wt % |
| Boric acid | 0.5 ± .04 wt %. |

5. The temperature sensor according to claim 4, wherein the main component is alumina.

6. The temperature sensor according to claim 5, wherein the alumina component has an average particle size of not less than 1 μm.

7. The temperature sensor according to claim 5, wherein the alumina component has an average particle size of 1 μm to 4 μm.

* * * * *